United States Patent
Burns et al.

(10) Patent No.: US 12,182,876 B2
(45) Date of Patent: Dec. 31, 2024

(54) SYSTEMS AND METHODS FOR CAPTURING IMAGES AROUND VEHICLE FOR INSURANCE CLAIM PROCESSING

(71) Applicant: RIVIAN IP HOLDINGS, LLC, Plymouth, MI (US)

(72) Inventors: Geoffrey Francis Burns, Palo Alto, CA (US); Michael Slattery, Irvine, CA (US); Arjuna Sivasithambaresan, San Francisco, CA (US); Erik Robert Glaser, San Mateo, CA (US)

(73) Assignee: RIVIAN IP HOLDINGS, LLC, Plymouth, MI (US)

(*) Notice: Subject to any disclaimer, the term of this patent is extended or adjusted under 35 U.S.C. 154(b) by 12 days.

(21) Appl. No.: 17/888,270

(22) Filed: Aug. 15, 2022

(65) Prior Publication Data
US 2023/0083504 A1 Mar. 16, 2023

Related U.S. Application Data

(60) Provisional application No. 63/240,474, filed on Sep. 3, 2021.

(51) Int. Cl.
*G06Q 40/00* (2023.01)
*B60R 25/30* (2013.01)
(Continued)

(52) U.S. Cl.
CPC .......... *G06Q 40/08* (2013.01); *B60R 25/305* (2013.01); *G06T 7/0002* (2013.01); *G06T 7/70* (2017.01);
(Continued)

(58) Field of Classification Search
CPC ......... G06Q 40/08; G06T 7/70; G06T 7/0002; G06T 2207/30232; G06T 2207/30252;
(Continued)

(56) References Cited

U.S. PATENT DOCUMENTS 6,616,210 B1 9/2003 Massey
9,503,860 B1 11/2016 Mankovskii et al.
(Continued)

OTHER PUBLICATIONS

U.S. Appl. No. 17/888,265, filed Aug. 15, 2022, Geoffrey Francis Burns.
(Continued)

*Primary Examiner* — Cho Kwong
*Assistant Examiner* — Mohammed H Mustafa
(74) *Attorney, Agent, or Firm* — HALEY GUILIANO LLP

(57) ABSTRACT

Systems and methods are provided for processing an insurance claim using a target captured image. A motion-based event associated with a vehicle is detected. One or more images of the motion-based event are captured automatically using a vehicle sensor. The one or more images are stored in a data stored associated with the vehicle. A request for an insurance claim from a user is received. A user interface is presented that enables the user to select the one or more images stored in the data store for associating the images with the insurance claim. A selection is received of at least one target image of the one or more images. Processing of the insurance claim is facilitated along with the selected at least one target image for processing.

20 Claims, 11 Drawing Sheets

(51) Int. Cl.
  *G06Q 40/08* (2012.01)
  *G06T 7/00* (2017.01)
  *G06T 7/70* (2017.01)
  *G07C 5/08* (2006.01)
  *H04N 7/18* (2006.01)

(52) U.S. Cl.
  CPC ........... *G07C 5/0825* (2013.01); *G07C 5/085* (2013.01); *H04N 7/188* (2013.01); *G06T 2207/30232* (2013.01); *G06T 2207/30252* (2013.01); *H04N 7/181* (2013.01)

(58) Field of Classification Search
  CPC .... B60R 25/305; G07C 5/0825; G07C 5/085; H04N 7/188; H04N 7/181
  USPC ................................................. 705/4, 35–45
  See application file for complete search history.

(56) References Cited

U.S. PATENT DOCUMENTS

| | | | |
|---|---|---|---|
| 10,220,704 | B2 | 3/2019 | Machak et al. |
| 10,351,133 | B1* | 7/2019 | Nave ..................... G06Q 40/08 |
| 10,504,302 | B1 | 12/2019 | Chavez et al. |
| 10,534,819 | B2 | 1/2020 | Ricci |
| 10,803,527 | B1* | 10/2020 | Zankat ................... G06Q 40/08 |
| 10,836,353 | B2* | 11/2020 | Zaharia ................ B60R 25/104 |
| 11,961,319 | B2 | 4/2024 | Mullins |
| 2010/0194885 | A1 | 8/2010 | Plaster |
| 2015/0112730 | A1* | 4/2015 | Binion ................... G06Q 40/08 |
| | | | 705/4 |
| 2015/0373308 | A1* | 12/2015 | Chen ....................... H04N 5/772 |
| | | | 348/148 |
| 2017/0066406 | A1* | 3/2017 | Ricci ..................... G06Q 10/02 |
| 2017/0200197 | A1 | 7/2017 | Brubaker |
| 2017/0316254 | A1 | 11/2017 | Hariri et al. |
| 2018/0094969 | A1* | 4/2018 | Kim .................. G01N 29/4436 |
| 2018/0225769 | A1* | 8/2018 | Slusar ..................... G06Q 40/08 |
| 2019/0385239 | A1* | 12/2019 | Thompson ............. G06Q 40/08 |
| 2020/0156592 | A1 | 5/2020 | Zaharia |
| 2020/0382692 | A1 | 12/2020 | Vang |
| 2021/0035233 | A1* | 2/2021 | Davis ..................... G06Q 40/08 |
| 2021/0056642 | A1* | 2/2021 | Engelhorn ............. G06Q 40/08 |
| 2021/0178986 | A1 | 6/2021 | Falb et al. |
| 2021/0245662 | A1 | 8/2021 | Blank et al. |
| 2021/0248908 | A1 | 8/2021 | Sato |
| 2021/0390307 | A1 | 12/2021 | Rogness et al. |
| 2022/0207278 | A1 | 6/2022 | Nagata et al. |
| 2022/0292612 | A1* | 9/2022 | Tofte ..................... G06Q 40/08 |

OTHER PUBLICATIONS

Car Safety and Security Features, URL: https://www.tesla.com/support/car-safety-security-features#sentry, retrieved on Aug. 15, 2022 (6 pages).

Dashcam and Sentry Mode, URL: https://www.tesla.com/ownersmanual/model3/en_jo/GUID-3C7A4D8B-2904-4093-9841-35596A110DE7.html, retrieved on Aug. 15, 2022 (6 pages).

Sentry Mode: Guarding Your Tesla, URL: https://www.tesla.com/blog/sentry-mode-guarding-your-tesla, retrieved on Aug. 15, 2022 (2 pages).

* cited by examiner

SYSTEMS AND METHODS FOR CAPTURING IMAGES AROUND VEHICLE FOR INSURANCE CLAIM PROCESSING

CROSS-REFERENCE TO RELATED APPLICATIONS

This application claims the benefit of U.S. Provisional Patent Application No. 63/240,474, filed Sep. 3, 2021, the disclosure of which is hereby incorporated by reference herein in its entirety.

INTRODUCTION

The present disclosure is directed to vehicle monitoring and insurance processing. More particularly, the present disclosure is directed to intruder deterrence and appending captured data to an insurance claim.

SUMMARY

Systems and methods are disclosed herein to monitor the surrounding area of a vehicle as an intruder deterrence system. For example, a system monitors the proximity of intruders to a vehicle and controls different functions of the vehicle based on the level of deterrence and the length of the presence of the intruder within a certain area.

In some embodiments, the system includes a plurality of cameras configured to capture images of a surrounding environment of a vehicle. The system further includes processing circuitry configured to detect a first motion-based event. Based on detecting the first motion-based event, the system stores images from at least one of the plurality of cameras. The system further detects a second motion-based event. For example, when a user or object approaches the vehicle. Based on detecting the second motion-based event, the system then performs a first defensive action. The first defensive action may be selected from any one or more of a visual alert, an audible alert, closing a window, locking a door, or closing an enclosure.

In some embodiments, the system detects a third motion-based event associated with an exterior storage area of the vehicle. In some embodiments, one camera of the plurality of cameras is positioned at the upper rear of an occupant compartment and has a view of the exterior storage area of the vehicle. The exterior storage area of the vehicle, in some embodiments, includes a truck bed. Based on detecting a collision event, the system may prompt the user to take action. In some embodiments, the system may prompt the user to submit an insurance claim. The insurance claim may be sent to and processed by an entity that manufactures the vehicle or by a third-party insurance claim processor. In some embodiments, the system may prompt the user to visit a repair shop amongst a network of certified repair shops that are owned and operated by the vehicle manufacturer in order to get the vehicle inspected. In some embodiments, the processing circuitry identifies a location of damage associated with the collision event on the vehicle based on at least one featured image from the captured images. The processing circuitry inserts the at least one featured image from the captured images associated with the location of damage in the insurance claim.

In some embodiments, the system detects a collision event. In some embodiments, the system detects the collision event using one or more of an audible sensor configured to monitor elevated sounds or an accelerometer sensor configured to monitor speed changes. Based on detecting a collision event, the system may prompt the user to take action. In some embodiments, the system may prompt the user to submit an insurance claim. The insurance claim may be sent to and processed by an entity that manufactures the vehicle or by a third-party insurance claim processor. In some embodiments, the system may prompt the user to visit a repair shop amongst a network of certified repair shops that are owned and operated by the vehicle manufacturer in order to get the vehicle inspected. In some aspects of the disclosure, the processing circuitry identifies a location of damage associated with the collision event on the vehicle based on at least one featured image from the captured images. The processing circuitry inserts the at least one featured image from the captured images associated with the location of damage in the insurance claim.

In some embodiments, communication circuitry is connected to the processing circuitry and is configured to transmit the at least one featured image from the captured images of the collision event to one or more of a user mobile device associated with the vehicle, an insurance server, or a cloud-based server.

Additionally, systems and methods are disclosed herein to streamline populating an insurance claim when a collision or some form of damage occurs. By using a simple and intuitive interface, users can conveniently view and transmit/append motion-detected videos and images to an insurance claim in response to a collision or damage to the vehicle.

In some embodiments, the systems and methods include a vehicle sensor configured to detect a motion-based event associated with a vehicle. The vehicle sensor may be configured to capture an image or a video of the surrounding environment of the vehicle. The system automatically captures via the vehicle sensors at least one featured image of the motion-based event. The system includes processing circuitry configured to receive a request for an insurance claim from a user. The processing circuitry further presents a user interface enabling the user to select the at least one featured image associated with the insurance claim. The processing circuitry receives a selection of the at least one featured image. The processing circuitry submits the insurance claim along with the selected at least one featured image for processing.

In some embodiments, the system determines that an enhanced security or guard mode is enabled for the vehicle. Based on the guard mode being enabled, the system permits one or more vehicle sensors to capture motion-based events. In some embodiments, the security or guard mode is triggered automatically when the vehicle is locked. In other embodiments, the security or guard mode is enabled in response to the vehicle being away from a trusted location.

In some embodiments, the system receives a request for the insurance claim from one of a vehicle infotainment screen or a vehicle mobile application. In response to receiving the request for the insurance claim, the system may automatically populate one or more fields in the request. The one or more fields may be selected from a date, a time, a location of the vehicle, or a location of the motion-based event.

In some embodiments, the motion-based event associated with the vehicle is based on at least one or more of a vehicle collision data, a vehicle pressure data, or an airbag deployment data.

In some embodiments, the system identifies at least one featured image of the motion-based event to be associated with the insurance claim. In some embodiments, the system identifies at least one featured image of the motion-based event to be associated with the insurance claim in response to receiving a request. The system then populates the insurance claim with the identified at least one featured image.

In some embodiments, the vehicle sensor is connected to an on-board computer configured to operate the vehicle. In some embodiments, the on-board computer is configured to operate the vehicle as an autonomous vehicle. The on-board computer may be communicatively connected to one or more of a mobile device via a wireless connection, insurance server, or a cloud-based server. In some embodiments, the system, in response to a request or automatically, transmits the stored images and videos of motion-based events to the cloud via a server. In some embodiments, the vehicle may process the video to reduce the size of the video by performing an analysis on the video and cutting out extraneous content. In yet another embodiment, the vehicle may transmit a lower quality version to the server and may request confirmation for transfer of the higher quality version.

In some embodiments, the processing circuitry determines a collision event. The processing circuitry may determine a collision event in response capturing at least one featured image of the motion-based event. The processing circuitry identifies a location of damage associated with the collision event on the vehicle based on the at least one featured image. The processing circuitry inserts the at least one featured image associated with the location of damage in the insurance claim.

In some embodiments, the processing circuitry determines a level of damage to the vehicle based on at least one featured image of the motion-based event stored at a first storage location. When the level of damage to the vehicle exceeds a threshold, the processing circuitry causes the at least one featured image of the motion-based event to be stored at a second storage location remote from the first storage location.

In some embodiments, the processing circuitry presents an alert of the motion-based event on the user interface. The processing circuitry may receive a selection to view the at least one featured image of the motion-based event and generate for presentation on the user interface the at least one featured image.

In some embodiments, the processing circuitry categorizes the at least one featured image into a location-based category based on a location of the motion-based event.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
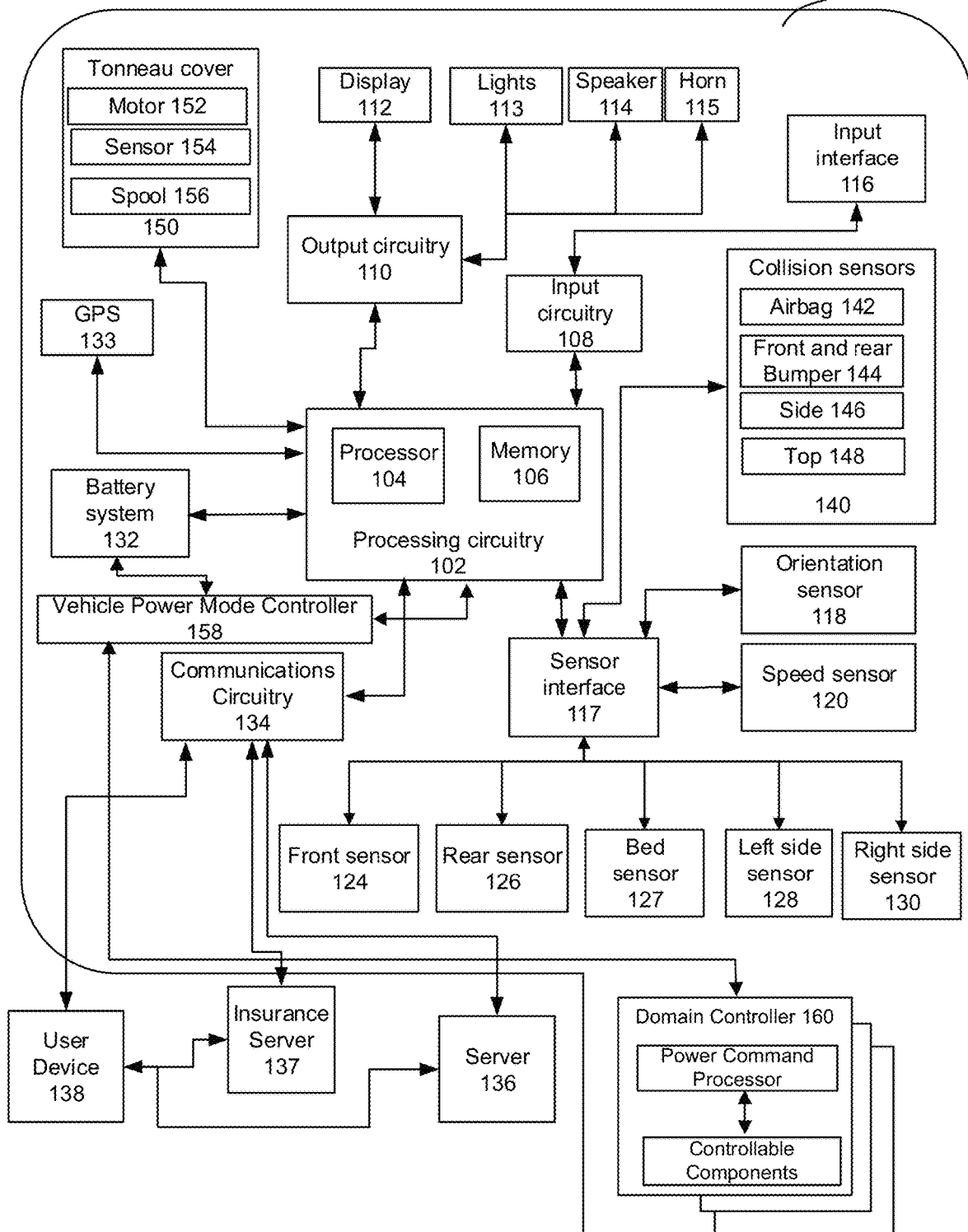
FIG. 1 shows a block diagram of components of a system of a vehicle configured to monitor the surrounding area of the vehicle, in accordance with some embodiments of the present disclosure.

FIG. 1 shows a block diagram of components of a system 100 of a vehicle 101 configured to monitor the surrounding area of the vehicle, in accordance with some embodiments of the present disclosure. In some embodiments, the system 100 of a vehicle 101 is configured to capture images for an insurance claim. Vehicle 101 may be a car (e.g., a coupe, a sedan, a truck, an SUV, a sport utility vehicle, a full-size van, a minivan, a delivery van, a bus), a motorcycle, an aircraft (e.g., a drone), a watercraft (e.g., a boat), or any other type of vehicle. Vehicle 101 may include any kind of motor or motors capable of generating power (e.g., gas motors, gas-electric hybrids motors, electric motors, battery-powered electric motors, hydrogen fuel cell motors).

Vehicle 101 may comprise processing circuitry 102 which may include processor 104 and memory 106. Processor 104 may comprise a hardware processor, a software processor (e.g., a processor emulated using a virtual machine), or any combination thereof. In some embodiments, processing circuitry 102 is part of an on-board computer, that is configured to operate the vehicle. In some embodiments, the on-board computer may be configured to operate the vehicle autonomously or semi-autonomously. The on-board computer may include communications drivers that communicate with a user device 138 and servers 136. In some embodiments, processor 104 and memory 106 in combination may be referred to as processing circuitry 102 or an on-board computer of vehicle 101. In some embodiments, processor 104 alone may be referred to as processing circuitry 102 of vehicle 101.

Memory 106 may include hardware elements for non-transitory storage of commands or instructions, that, when executed by processor 104, cause processor 104 to operate vehicle 101 in accordance with embodiments described above and below. For example, memory 106 may comprise a data store or may be communicatively coupled to a data store configured to locally or remotely store instructions or data associated with motion-based events, reactions to motion-based events by the driver or the system, or combinations thereof. The data store (e.g., memory 106) may correspond to a machine-learning type of processor wherein the data collected, stored, and characterized by processing circuitry 102 may be used to update preferences, responses, and other characterizations output by system 100 related to detected motion-based events. For example, trajectories of the vehicle comprised of system 100 as well as trajectories of vehicles that crashed into the vehicle may be recorded and stored for the purposes of identifying when to first alert a driver to a potential incident that may result in an insurance claim. In another example, the images are binned based on identifiable objects based on categories created in a remote storage system for updating the protocols of system 100 by batch software updates or remote processing of data processed via processing circuitry 102.

Processing circuitry 102 may be communicatively connected to components of vehicle 101 via one or more wires, or via wireless connection. For example, the one or more captured images or videos related to motion events may be automatically uploaded to the server 136 (e.g., in compressed or full format) and a user device 138 can access and view the one or more captured images or videos. Alternatively, the one or more captured images or videos can be accessed remotely from the vehicle 101 (e.g., when the vehicle is connected to the Internet or only when connected via WiFi or plugged into a charger).

Processing circuitry 102 may be communicatively connected to input interface 116 (e.g., a steering wheel, a touch screen display, buttons, knobs, a microphone, or other audio capture device, etc.) via input circuitry 108. In some embodiments, a driver and/or occupant of vehicle 101 may be permitted to select certain settings in connection with the operation of vehicle 101. In some embodiments, processing circuitry 102 may be communicatively connected to GPS system 133 or other positioning devices of vehicle 101, where the driver may interact with the GPS system via input interface 116. GPS system 133 may be in communication with multiple satellites and/or servers 136 remote from vehicle 101 to ascertain the driver's location and provide navigation directions to processing circuitry 102. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 uses the determined location to populate the insurance claim. In some embodiments, processing circuitry 102 uses the determined location to identify whether vehicle 101 is within a threshold range of a tagged location.

Processing circuitry 102 may be communicatively connected to display 112, lights 113, speaker 114 and horn 115 by way of output circuitry 110. Display 112 may be located at a dashboard of vehicle 101 and/or a heads-up display at a windshield of vehicle 101. For example, an interface for GPS system 133 or an interface of an infotainment system may be generated for display, and display 112 may comprise an LCD display, an OLED display, an LED display, or any other type of display. Lights 113 may be located at any location within the cabin of vehicle 101, on the exterior of the vehicle, e.g., at the dashboard of vehicle 101, on an interior portion of the vehicle door, exterior flasher lights, exterior headlights, exterior blinker lights, etc. In some embodiments, the lights may be LED lights and may increase luminance based on an intruder's proximity. For example, as the intruder approaches the vehicle, the fog lights may increase to a maximum. Further, the horn may be triggered in periodic horn patterns having a variety of pulses. In some cases, the horn may be triggered every 2 seconds. Speaker 114 may be located at any location within the cabin of vehicle 101, e.g., at the dashboard of vehicle 101, on an interior portion of the vehicle door, etc. Horn 115 may be located at any location within the cabin of vehicle 101 or exterior of the vehicle. The horn may be programmable for multiple audible patterns or variations of sounds.

Processing circuitry 102 may be communicatively connected (e.g., by way of sensor interface 117) to sensors (e.g., front sensor 124, rear sensor 126, truck bed sensor 127, left side sensor 128, right side sensor 130, orientation sensor 118, speed sensor 120). Orientation sensor 118 may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 120 may be one of a speedometer, a GPS sensor, or the like, or any combination thereof, and may be configured to provide a reading of the vehicle's current speed to processing circuitry 102. Front sensor 124, rear sensor 126, truck bed sensor 127, left side sensor 128, and/or right side sensor 130 may be positioned at a variety of locations of vehicle 101, and may be one or more of a variety of types, e.g., an image sensor, an ultrasonic sensor, a radar sensor, LED sensor, LIDAR sensor, etc., configured to measure the distance between vehicle 101 and an object in a surrounding environment of the vehicle (e.g., by outputting a light or radio wave signal, and measuring a time for a return signal to be detected and/or an intensity of the returned signal, and/or performing image processing on images captured by the image sensor of the surrounding environment of vehicle 101). In some embodiments, processing circuitry 102 may take into account the acceleration/deceleration of vehicle 101, e.g., based on sensor data generated by orientation sensor 118, when determining a predicted distance between vehicle 101 and an intruder or another object.

Processing circuitry 102 may further be communicatively connected (e.g., by way of sensor interface 117) to collision sensors 140 (e.g., airbag 142, bumper 144, side 146). The collision sensors 140 may include an airbag system, e.g., window area sensors, airbag system, and collision sensor. The airbag system includes multiple airbags 142 arranged proximate to one or more window areas or other areas of the vehicle and configured to transmit a signal to processing circuitry in response to the deployment of an airbag. Vehicle collision sensor(s) 140 typically include gyroscopes, accelerometers, or both. For example, vehicle collision sensor(s) 140 may include a MEMS accelerometer capable of detecting the deceleration of a vehicle during a crash and position of the vehicle. Vehicle collision sensor(s) 140 may be arranged at various positions in a vehicle. For example, vehicle collision sensor(s) 140 may be configured to detect impacts, motion, and deceleration at the front of vehicle 101, side of vehicle 146, rear of vehicle 144, top of vehicle 148, or a combination thereof (e.g., at the corners of vehicle 101). In some embodiments, vehicle collision sensor(s) 140 includes more than one sensor, each having similar circuitry and capabilities for detecting collision scenarios for vehicle 101. In some embodiments, vehicle collision sensor(s) 140 includes more than one sensor, each having different capabilities that are, for example, designed for the particular location of the vehicle. In some embodiments, the sensors are configured to capture video. In some embodiments, the level of damage may be determined based on the damage occurring at a particular location on the vehicle. For example, the vehicle may be involved in a small bumper-to-bumper accident, and the location sensors for the bumper may indicate the level of damage as low based on a signal from a sensor. In some embodiments, vehicle collision sensor(s) 140 includes a seat sensor configured to detect whether a person is sitting in a particular seat.

Vehicle collision sensor(s) 140 may be in communication with processing circuitry 102. In some embodiments, the processing circuitry is configured to analyze data from vehicle collision sensor(s) 140 and send one or more signals to activate one or more airbags 142 of airbag system. Based on information from vehicle collision sensor(s) 140, processing circuitry 102 may determine a crash type (e.g., a side, a front, a rear, a corner or a rollover collision or a flooding event) and vehicle occupancy (e.g., driver, and passengers, if any) and initiate deployment of a suitable airbag of airbag system for the crash type. Based on information from vehicle collision sensor(s) 140, processing circuitry 102 may determine which camera captured images or video of the crash for uploading to insurance claims to streamline the processing. Vehicle pressure data may be generated from the sensor inside the vehicle. An airbag deployment data may be generated from the airbag system.

A level of damage to the vehicle may be determined based on the vehicle pressure data, airbag deployment data and vehicle collision data. For example, based on the impact of a collision, one or more airbags may be deployed. By determining that certain airbags deploy at different pressures and different impacts, the processing circuitry may determine which part of the vehicle is damaged and how much damage there may be. Similarly, the sensors around the vehicle may be programmed on a certain pressure threshold. For example, when a collision to a front bumper occurs, the processing circuitry may correlate the pressure to the front of the vehicle to estimate the level of damage to the vehicle. Based on determining that only a small pressure change occurred (e.g., backing up while parking the vehicle), the level of damages does not exceed a damage threshold, the vehicle does not start an insurance claim. In some embodiments, based on the level of damage falling below the damage threshold, the system may provide recommendations to seek out a Rivian Certified Repair Network to get the vehicle inspected. For example, for frequent accident types, (e.g., low severity parking lot type events), the system via the user interface on the vehicle or a user device may prompt the user to gather information necessary to estimate the damage. Based on the estimated damage, the user may submit information as part of an insurance claim. For example, use a smartphone to capture images of the damaged areas for artificial intelligence driving damage estimates and start a First Notice Of Loss (FNOL) process.

On the other hand, in response to the level of damage exceeding a damage threshold (e.g., multiple airbags were deployed, bumper pressure exceed a limit as determined by a sensor), the system begins to process an insurance claim and appends and the captured image to the insurance claim. In some embodiments, the system provides a choice for the user to select an image. In some embodiments, the severity of an accident can trigger additional and/or other activities, e.g., emergency response, accident cleanup, towing, alternative transportation, etc. In some embodiments, the severity of the accident may be identified by the location of the damage. For example, if a rear bumper sensor is triggered and no additional sensors are triggered, the severity may be low. On the other hand, if multiple sensors at the rear of the vehicle stop transmitting a signal or transmit a signal indicative of an accident, then the severity may be determined to be high. Based on the determined severity, the accident may trigger one or more activities, e.g., mechanic recommendation, insurance claim, emergency response, accident cleanup, towing, alternative transportation, etc.

The processing circuitry 102 may detect a collision based on the data provided from one or more vehicle collision sensor(s) 140. For example, an airbag being deployed or a pressure sensor detecting contact with an object. In some embodiments, the processing circuitry 102 detects a collision based on loss of signal from one or more sensors on the exterior of the vehicle. In some embodiments, the processing circuitry 102 determines a collision type (e.g., a side, a front, a rear, or a corner collision) and vehicle occupancy (e.g., driver, and passengers, if any) based on pressure sensors throughout the vehicle. In some embodiments, the processing circuitry 102 determines that a collision event occurred by one or more audible sensors configured to monitor elevated sounds. For example, a sudden elevated decibel sound may alert the operator that a collision occurred. To avoid generating a false alarm that a collision occurred, the processing circuitry 102 may perform an additional check, including pressure at the ultrasonic sensors and/or airbag activation.

In some embodiments, detecting that a collision occurred is performed by computer vision to detect contact with the vehicle and be verified through small acceleration events that without computer vision would be insufficient to trigger an event. The processing circuitry 102 performs computer vision analysis using sensors around the vehicle's exterior to detect any movement of the vehicle and contact with the vehicle by another object. For example, a bumper-to-bumper collision in a parking lot that does not trigger airbag deployment may register by computer vision of the vehicle and may provide a recommendation to the central display of the vehicle or the mobile application to inspect the damage by a repair shop within the network of certified repair shops owned and operated by the entity that manufactures the vehicle and provides the mobile application to the user.

In some embodiments, the processing circuitry 102 determines the collision event by one or more accelerometer sensors configured to monitor changes in speed. For example, if the speed of the vehicle changes, the processing circuitry 102 may perform a vehicle collision sensor check to ensure that all sensors on the exterior of the vehicle are responsive. In response to the sensors not responding, the processing circuitry 102 may determine that a collision occurred and being the process of populating an insurance claim.

Processing circuitry 102 may further be communicatively connected to a tonneau cover 150 or another cover for closing an exterior storage compartment. The tonneau cover 150 may include a motor 152, one or more sensors 154, and spool 156. Motor 152 may include, for example, a DC motor (e.g., permanent magnet motor, brushed or brushless motor, wound stator), an AC motor (e.g., an induction motor), any other suitable motor having any suitable number of poles and phases, or any combination thereof. For example, motor 152 may include a permanent magnet DC motor configured to operate at 12 VDC. A clutch may be configured to couple and de-couple motor 152 from spool 156. For example, in some embodiments, the clutch is controlled by processing circuitry, which may provide control signals for engaging or disengaging the clutch. In an illustrative example, the clutch may be disengaged to allow free-spooling of the tonneau cover. Spool 156 is coupled to motor 152, optionally via a gearset to provide gear reduction, and rotates with a motor shaft of motor 152. The cable is wound on spool 156 and is used to pull or tow tonneau cover from an open position to a closed position. Sensor(s) 154 may include voltage sensors, current sensors, temperature sensors, impedance sensors, position sensors (e.g., encoders for determining spool position), torque sensors, any other suitable sensors, or any combination thereof. Tonneau cover 150 may be integrated into the body and/or the frame of the vehicle storage compartment or may be affixed to the vehicle separately, although the electric power and controls for Tonneau cover 150 are coupled to the vehicle 101. In some embodiments, tonneau cover 150 may include power electronics (e.g., a motor drive), and accordingly may be coupled to battery system 132 and be configured to receive control signals from processing circuitry (e.g., analog signals, PWM signals, digital signals, messages).

Processing circuitry 102 may be communicatively connected to battery system 132, which may be configured to provide power to one or more of the components of vehicle 101 during operation. In some embodiments, vehicle 101 may be an electric vehicle or a hybrid electric vehicle. In some embodiments, the processing circuitry 102 may monitor the environment surrounding the vehicle by utilizing a plurality of battery cells packaged together to create one or more battery modules or assemblies to store energy and release the energy upon request.

In some embodiments, communications circuitry 134 and/or user device 138 (e.g., a mobile device) may be in communication with one or more insurance servers 137, and servers 136 (e.g., over a communications network such as, for example, the Internet), which may be configured to perform any suitable portions of the processing described above and below. The insurance servers 137 is configured to receive and process insurance claims with the image or video associated with the collision.

In some embodiments, an insurance claim is started by a user manually. Based on the user manually starting the insurance claim and inputs a date, time, and location, video corresponding to that date/time/location can be automatically found and presented to the user for selections/addition to the claim. In some embodiments, an insurance claim is started based on a detection of damage as a result of a collision. Based on damage is detected (e.g., an object is detected to be in the closest range of the vehicle and a collision sensor (e.g., an accelerometer) detects changes in vehicle motion, then the user can be prompted (via user interface or a mobile device) to submit an insurance claim. The vehicle can automatically select the images corresponding to the collision event for submission with the insurance claim. In addition, the insurance claim can be at least partially filled out automatically (e.g., day, time, location and possibly a description of the incident—e.g., the vehicle was parked, and another vehicle approached and collided with the right side of the vehicle). In some embodiments, the processing circuitry 102 collects second-by-second or sub-second level speed, accelerations, driving mode, and sensor readings (in addition to the video). Based on the collected data, the processing circuitry 102 may provide additional data around the collision event to the insurance claim. In some embodiments, the processing circuitry may receive via a microphone from the user a voice-over description of the events. The voice-over description may be uploaded to the video or images in the insurance claim. Having such a description in the insurance claims provides additional context and makes recall better in the future if additional details are needed about the event.

The data collected from the one or more sensors may be received by the system 100 and used to evaluate the care used by the user for an insurance carrier who may have provided or may be providing the supplemental or on-demand insurance coverage. Table 1 presents a list of data that may be included in the vehicle driving data. Table 1 includes a data field that may be logged and, for those quantities that are regularly sampled and/or stored, a frequency with which the data is sampled and/or stored.

TABLE 1

| Field | Description | Example Sampling/ Storing Frequency |
|---|---|---|
| Time Stamp | Timestamp taken from every variable reporting at one-second granularity | 1 Hz |
| Vehicle Speed | Calculated using multiple sensors including speed of each motor | 1 Hz |
| Accelerometer | Measuring 3-axis movement throughout the vehicle | 10 Hz |
| Hard Braking | | 1 Hz |
| Rapid Acceleration | | 1 Hz |
| Aggressive cornering | | 1 Hz |
| Autonomous Mode On/Off | Enabled and Disabled | 1 Hz |
| Autonomous Mode Indicators | Warnings, driver actions, feature status, feature sub-state, etc. | 1 Hz |
| Adaptive Cruise Control On/Off | Enabled and Disabled | 1 Hz |
| Adaptive Cruise Control Status | Warnings, driver actions, feature status (set, cancel, resume, etc.), feature sub-state, distance/gap settings, speed settings, etc. | 1 Hz |
| Lane Keeping Assist On/Off | Enabled and Disabled | 1 Hz |
| Lane Keeping Assist | Warnings (LH, RH), driver actions, feature status, feature sub-state, etc. | 1 Hz |
| Lane Departure Warning On/Off | Enabled and Disabled | 1 Hz |
| Lane Departure Warning | Warnings (LH, RH), driver actions, feature status, feature sub-state, etc. | 1 Hz |
| Manual Park Assist On/Off | Enabled and Disabled | 1 Hz |
| Manual Park Assist | Warnings, driver actions, feature status, feature sub-state, etc. | 1 Hz |
| Auto Emergency Braking Engaged On/Off | Enabled and Disabled | 1 Hz |
| Auto Emergency Braking Engaged | Warnings, Proximity, driver actions, vehicle actions, feature status, feature sub-state, etc. | 1 Hz |
| Hands off the wheel | Warnings, driver actions, feature status, feature sub-state, etc. | 1 Hz |
| Forward Collision Warning On/Off | Enabled and Disabled | 1 Hz |
| Forward Collision Warning | Warnings, Proximity, driver actions, vehicle actions, feature status, feature sub-state, etc. | 1 Hz |
| Rear Cross Traffic Alert On/Off | Enabled and Disabled | 1 Hz |
| Rear Cross Traffic | Warnings, Proximity, driver actions, | 1 Hz |

TABLE 1-continued

| Field | Description | Example Sampling/ Storing Frequency |
|---|---|---|
| Alert | vehicle actions, feature status, feature sub-state, etc. | |
| Blindspot Monitoring On/Off | Enabled and Disabled | 1 Hz |
| Blindspot Monitoring | Warnings, Proximity, driver actions, vehicle actions, feature status, feature sub-state, etc. | 1 Hz |
| Backup Warning System On/Off | Enabled and Disabled | 1 Hz |
| Backup Warning System | Warnings, Proximity, driver actions, vehicle actions, feature status, feature sub-state, etc. | 1 Hz |
| Distraction/Inattention On/Off | Enabled and Disabled Status for each monitoring device, driver monitoring system and any additional sensors being used | 1 Hz |
| Distraction/Inattention | Eyes on road, head and/or eye positions, pupil dilation, warnings, driver actions, feature status, feature sub state, etc. | 1 Hz |
| Proximity Sensors | Object distance from the vehicle - vehicles, pedestrians, etc. - multiple sensors including radar, LiDAR, video, ultrasonic, etc. | 1 Hz |
| Impact Sensor Event | | 1 Hz |
| Crash Detection | Incident detection, location of impact, severity of impact, sensors damaged, etc. | 1 Hz |
| Airbag Deployment | | 1 Hz |
| Vehicle Roll-over | | 1 Hz |
| Vehicle Spin-out | | 1 Hz |
| Driver Seatbelt Event | Seat occupied, seatbelt status | 1 Hz |
| Passenger Seatbelt Event | Seat occupied, seatbelt status | 1 Hz |
| Driver Detection | Driver ID detection, age, gender, key type, user role, known insured, vehicle settings and connections, etc. | 1 Hz |
| Headlights On/Off | On/Off, high or low beam, status, fault, warnings, animations, etc. | 1 Hz |
| Warning Lights On/Off | Status | 1 Hz |
| Smartphone Paired | Enabled, name, usage, warnings, features status, sub feature status, etc. | 1 Hz |
| Traffic Sign Recognition | Enabled or disabled, feature status, failures, type, translation, etc. | 1 Hz |
| Traffic Light Info | Enabled or disabled, feature status, failures, type, translation, etc. | 1 Hz |
| High Beam Assist | Feature Status | 1 Hz |
| Tire Pressure | Status, position, pressure, warnings, actions | 1 Hz |
| Door Locks | Locked, unlocked, door ajar, failures, door location, signals, warnings, feature status, etc. | 1 Hz |
| Video recording during trip | Enabled or disabled, frame rate, storage location, storage type, storage space, retrieval, recording ID, recording flags, etc. | 1 Hz |
| Video recording when parked | Enabled or disabled, frame rate, storage location, storage type, storage space, retrieval, recording ID, recording flags, etc. | 1 Hz |

In some embodiments, the system may automatically share the captured information from a motion event or a collision event with the insurance company for processing. In such a case, the user of the vehicle may opt into this automated data sharing of data from the vehicle with their insurance company.

It should be appreciated that FIG. 1 only shows some of the components of vehicle 101, and it will be understood that vehicle 101 also includes other elements commonly found in vehicles (e.g., electric vehicles), e.g., a motor, brakes, wheels, wheel controls, turn signals, windows, doors, etc.

FIG. 1 also depicts domain controllers 160 (e.g., modules), in accordance with some embodiments of the present disclosure. System 100 may implement a power modes application to coordinate vehicle-level management of wake, activity level, and sleep behaviors of devices in vehicle 101. For example, the power modes application may coordinate vehicle-level management of wake, activity level, and sleep behaviors of devices of vehicle 101 to reduce unnecessary power consumption by the controllers/devices of vehicle 101, while making vehicle 101 appear to a user as though it is always on. Domain controllers 160 may be inclusive of or interface with a telematics control module, an experience management module (XMM), an alarm module, a body control module (BCM), a battery management system (BMS), and an intelligent battery sensor. Domain controllers 160 may include other suitable vehicle modules such as an autonomous control module (ACM), an autonomous safety module (ASM), a vehicle dynamics module (VDM), a thermal management module (TMM), and combinations thereof. Domain controllers 160 may control certain functions of vehicle 101. Network management by the power modes application may allow for coordination between different power-saving states (e.g., a sleep state, a standby state, a ready state, a guard state or a guard mode, and a stealth state) and an ON state (i.e., a wake (awake) state, a go state, or an active guard mode with active deterrence methods enabled with powered modules) of the distributed domain controllers 160 within vehicle 101.

In some embodiments, system 100 may comprise a plurality of sensors configured to provide data to the processing circuitry to have the processing circuitry characterize the first-motion based event, the second motion-based event, or combinations thereof. A vehicle power mode controller may be configured to interface with at least one domain controller. The at least one domain controller may correspond to a list of components, systems, subsystems, processes, or combinations thereof, that need to be active in order for system 100 to enable a vehicle comprising system 100 to perform appropriate reactive steps based on a nature of a motion-based event characterized by the processing circuitry. In some embodiments, the vehicle power mode controller may directly determine whether the plurality of cameras, the plurality of sensors, or combinations thereof receive power from a vehicle interfacing with the system. In response to detecting the first motion-based event, the processing circuitry may also determine a motion-based event type. The motion-based event type is used at least in part to instruct the vehicle power allocation controller to activate the plurality of cameras, the plurality of sensors or combinations thereof to characterize the first motion-based event, the second-motion based event, or combinations thereof. The motion-based event type may include status indicators or labels corresponding to a reportable insurance claim, an intrusion, a collision, a theft, or combinations thereof. Additionally, the motion-base event types may be divided based on vehicle power states enabled, vehicle power states required to response, whether the vehicle is moving autonomously, whether the vehicle is moving based on driver inputs, whether the vehicle is stationary, whether the vehicle is being operated by a driver other than the known owner, or combinations thereof.

The power-saving states may turn off certain hardware and/or software resources, as well as reduce the frequency of certain checks or control routines. In one embodiment, a domain controller in a stealth state may appear to be off to the other ones of domain controllers 160 and to processing circuitry 102, but itself is able to wake up (e.g., from a sleep state) and wake downstream components to perform any functionality that is not dependent on another subsystem. In response to receiving a notification (e.g., a detection or determination of a first motion-based event), processing circuitry 102 may compute, determine, identify, or a combination thereof, the required power mode of system 100 (e.g., a passive mode, a first motion-based event response or monitoring mode, a second motion-based event response or monitoring mode, and a defensive actions active mode) and broadcast the power mode (e.g., by vehicle power mode controller 158) to each of the plurality of domain controllers 160 (e.g., using a C-Bus protocol). In response to receiving an indication of a required power mode from vehicle power mode controller 158, each of the plurality of domain controllers 160 may interpret the received indication and make a determination of whether to update their current state (e.g., by activating a camera, a sensor, a defensive action module, or a combination thereof), and control respective components and optionally update their current state.

Processing circuitry 102 and the plurality of domain controllers 160 may be implemented using software running on one or more general purpose or specialized processors (e.g., electronic control units (ECUs) or electronic control modules (ECMs)). For example, in one embodiment, system 100 may be implemented by a plurality of devices (modules) and a plurality of software components.

One or more of the plurality of domain controllers 160 may implement different types of suitable functions for the operation of vehicle 101. For example, one or more of the plurality of domain controllers 160 may implement sense functions (e.g., for monitoring or detecting a motion-based event and conditions related to the motion-based event), compute functions (e.g., for computing a power mode or computing a value-based input from the sense functions including when to change from a monitor state to a defensive action state such as when an object is approaching which may result in an impact), and act functions (e.g., to send a notification or command or broadcast a power mode, or to implement control such as closing a tonneau cover). In some embodiments, the motion-based event is vehicle motion sourced. For example, the vehicle could be driven down a street and have to rapidly change directions in response to conditions leading to an accident. In some embodiments, the motion-based event corresponds to objects or people approaching the vehicle. For example, a person could be approaching either a vehicle bay or a vehicle door with intent to damage the vehicle or steal from the vehicle.

In one example, the sense functions for vehicle 101 may include an authorized Bluetooth low energy (BLE) device proximity for determining the location/proximity of authorized BLE devices, a driver presence function to determine if a driver is present, a lock and unlock commands function for receiving lock/unlock commands, a 12V battery state of charge (SOC) function for determining if the low voltage (LV) batteries need to be charged, an LTE commands function for receiving LTE commands vehicle functionality, a door ajar status function detecting when a door is ajar, a scheduled activity function for scheduling activities on an internal clock timer, an alarm trigger status function for waking the vehicle when an alarm is triggered, a sentinel mode trigger status function for waking the vehicle when a sentinel mode triggers an alert, a vehicle behavior level function for sensing the current vehicle behavior level, a vehicle mode for sensing the current vehicle power mode, a high voltage (HV) charger connected function for sensing if an HV charger is connected, a receive vehicle power mode command function for receiving a vehicle power mode command (e.g., vehicle power mode controller 158), other functions or modes, or combinations thereof.

In one example, the compute functions for vehicle 101 may include a required power mode function for computing the required power mode state, a transition time out function related to diagnostics of system responsiveness, accuracy, or combinations thereof, an interpret vehicle power mode command function for determining which devices (e.g., domain controllers 160) need to be on or off based on a received vehicle power mode command, other compute functions, or combinations thereof.

In one example, the act functions for vehicle 101 may include a broadcast power mode function for broadcasting the power mode to the vehicle, a send timeout fault function for sending a timeout fault to a fault manager, a control components function for turning domain devices (e.g., domain controllers 160) ON or OFF based on a power mode interpretation, other act functions, or combination thereof.

It should be understood that the functions described above and illustrated in FIG. 2 are simply examples, and system 100 may execute numerous other functions to maintain smooth operation and transitions between operating states, while reducing unnecessary power consumption when vehicle 101 or functions of vehicle 101 are not in use. Although some functions are illustrated or described as being performed by processing circuitry 102, this is only an example and one or more of these functions may be performed by one of more of domain controllers 160. For example, in one embodiment, processing circuitry 102 may implement the BLE device proximity function to determine the location of authorized BLE devices (e.g., a mobile device of a user that is associated with vehicle 101). However, this is only an example, and it should be understood that a dedicated domain controller (e.g., a vehicle access system (VAS) module) may also perform this function.

Certain components of system 100 may communicate via a local interconnect network (LIN) protocol, a C-Bus protocol, Ethernet, by internet communication, etc. For example, each component of system 100 may be implemented as a device (e.g., including an ECU) and may include a plurality of sense functions, including a door ajar status function and a door lock status function. Although particular modules are described as implementing certain functions, it should be understood that this is only an example, and different modules may implement one or more functions described above or any other suitable vehicle functions.

Figure 2:
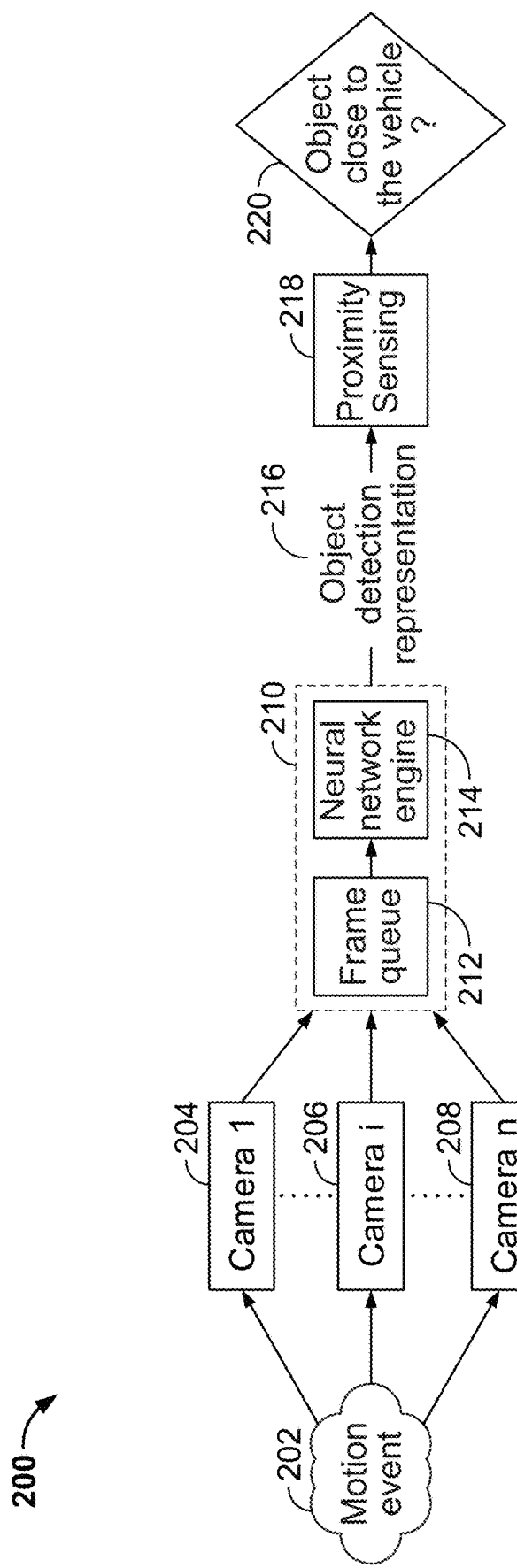
FIG. 2 shows a block diagram of a system of a vehicle configured to monitor a distance between a vehicle and an intruder or other surrounding objects, in accordance with some embodiments of the present disclosure.

FIG. 2 shows a block diagram of a system 200 of a vehicle 200 configured to monitor a distance between a vehicle and an intruder or other surrounding objects, in accordance with some embodiments of the present disclosure. System 200 may comprise multiple cameras 204, 206, 208, and object detection network 210, and proximity sensing module 218. In some embodiments, one or more components (e.g., object detection network 210 and proximity sensing module 218) of system 200 may be implemented by processing circuitry 102 (and/or processing circuitry of server 136). One or more of cameras 204, 206, 208 may each correspond to one of sensors 124, 126, 127, 128, 130.

Cameras 204, 206, 208 may be mounted on any suitable internal or external portion of vehicle 101. In some embodiments, one or more of cameras 204, 206, 208 may correspond to monocular fisheye cameras configured to cover a wide field of view around vehicle 101. While FIG. 2 depicts three cameras, it should be appreciated that any suitable number of cameras may be employed (e.g., less than three cameras or more than three cameras, such as, for example, four cameras respectively positioned at a front, rear and each side of vehicle 101). In some embodiments, five cameras may be respectively positioned at a front, rear and each side of vehicle 101 and facing a truck bed). Such cameras may be mounted at any suitable respective positions of vehicle 101 in order to facilitate the capturing images of the entire region or environment of a motion event 202 around vehicle 101, while vehicle 101 is stationary or in motion. A series of images may be captured by cameras 204, 206, 208, including any suitable number of images. In some embodiments, images may be captured repeatedly, e.g., at a predetermined frequency, to capture the surrounding environment of vehicle 101 over time.

One or more images or frames captured by cameras 204, 206, 208 may be input to object detection network 210, e.g., comprising frame queue 212 and neural network 214. Object detection network 210 may be configured to identify one or more candidate objects in the images captured by cameras 204, 206, 208 using any suitable image recognition technique. In some embodiments, processing circuitry 102 may manipulate any of the series of captured images such that a candidate object is located at a similar position across all camera images. Object detection network 210 may be configured to output one or more 2D object detection representation 216 for the one or more candidate objects. For example, object detection network 210 may be configured to draw 2D bounding shapes (e.g., bounding boxes, bounding polygons, bounding triangles, bounding ellipses, bounding circles, etc.) around candidate objects (e.g., vehicles, humans, animals, or other obstacles) positioned in front of, behind, or to a side of vehicle 101. Frame queue 212 may store the plurality of images captured by cameras 204, 206, 208 of the surrounding environment of vehicle 101, and such images may be input to neural network 214 in, e.g., a first-in first-out manner. Neural network 214 may be, e.g., a convolutional neural network (CNN), or any other suitable machine learning model trained to accept as input an image of a surrounding environment of vehicle 101 and output respective object detection representation 216 for the one or more candidate objects. Object proximity to vehicle 101 may be estimated based on the object detection representation. In some embodiments, when one or more of cameras 204, 206, 208 correspond to a fisheye camera, which produces a relatively large distortion based on its wide-angle lens, neural network 214 may be trained using images having a distortion similar to the distortion produced by fisheye camera lens.

In some embodiments, neural network 214 may be trained to learn patterns and features associated with certain classes of objects, e.g., a person, a car, a bus, a motorcycle, a train, a bicycle, background, etc. In some embodiments, such machine learning models may be trained to learn patterns and features associated with sub-classes (e.g., e.g., a sedan, a minivan, a truck) of a class (e.g., cars). Classification may be carried out by neural network 214 comprising one or more machine learning models, such as a CNN trained to receive input images of objects surrounding a vehicle (e.g., where the image may be annotated with any suitable bounding shape relative to an object and/or a distance from vehicle to object annotation and/or a class of object annotation), and output likelihoods that these vehicles correspond to particular vehicle categories. Such CNNs may be trained on training data sets containing images of vehicles manually tagged with their particular vehicle types. In some embodiments, any combination of the following classes may be employed in training and/or evaluating the model (e.g., background, airplane, bicycle, bird, boat, bottle, bus, car, cat, chair, cow, dining table, dog, horse, motorbike, motorcycle, person, potted plant, sheep, sofa, train, TV monitor, truck, stop sign, traffic light, traffic sign, motor). In some embodiments, a confidence score may be output along with the prediction of a class to which an identified object belongs (e.g., an 86% confidence an object is a human being).

In some embodiments, any suitable batch size may be used in training the model (e.g., 32, 64, etc.), and a ratio of negative to positive values (e.g., as communicated via a signal labelled negpos ratio) for hard negative mining may be any suitable value (e.g., 3, 5, etc.). In some embodiments, any suitable weights may be applied to the classes of objects (e.g., to account for entropy loss). For example, the classes of bicycle, bus, car, motorcycle, person, and train, may be assigned respective weights of 1.25, 0.9, 0.9, 0.9, 0.9. 1.25, 0.9. In some embodiments, a prior box from baseline may be updated considering the characteristics of a bounding shape of a particular object (e.g., person).

Proximity sensing module 218 may be configured to output a determination 220 of a proximity of the candidate object (associated with object detection representation 216) to vehicle 101. The proximity sensing module 218 may include outlier rejection model and object-to-vehicle distance estimation model. In some embodiments, one or more components (e.g., outlier rejection model and object-to-vehicle distance estimation model) of proximity sensing module 218 may be implemented by processing circuitry 102 (and/or processing circuitry of server 136).

Proximity sensing module 218 may receive one or more object detection representation 216 from object detection network 210, and perform preprocessing at 102, e.g., to extract suitable features from object detection representation 216, and/or convert object detection representation 216 into a vector or matrix representation, and/or match formatting of object detection representation 216 to formatting of template data, normalization, resizing, minimization, etc. In some embodiments, the processing circuitry may perform one or more of the following image processing techniques: brightening the image or portions thereof, darkening the image or portions thereof, color-shifting the image (e.g., among color schemes, from color to grayscale, or other mapping), cropping the image, scaling the image, adjusting an aspect ratio of the image, adjusting the contrast of an image, performing any other suitable processing to prepare the image, or any combination thereof. Any suitable number of features of the candidate object may be input to proximity sensing module 218 (e.g., an x coordinate, a y coordinate, a height, a width, etc., associated with an object).

The determination 220 of a proximity of the candidate object (associated with object detection representation 216) to vehicle 101 may determine whether the object is within a threshold distance. For example, is the object within a first deterrent threshold of the vehicle. In response to the object (e.g., intruder) within the first threshold distance of the vehicle, the processing circuitry will automatically wake up from sleep mode and begin recording the surrounding area of the vehicle. In some embodiments, based on the proximity of the object, the processing circuitry may begin to generate deterrents (e.g., first defensive actions to visual alerts, and audible alerts or second defensive actions, to close tonneau covers).

Figure 3:
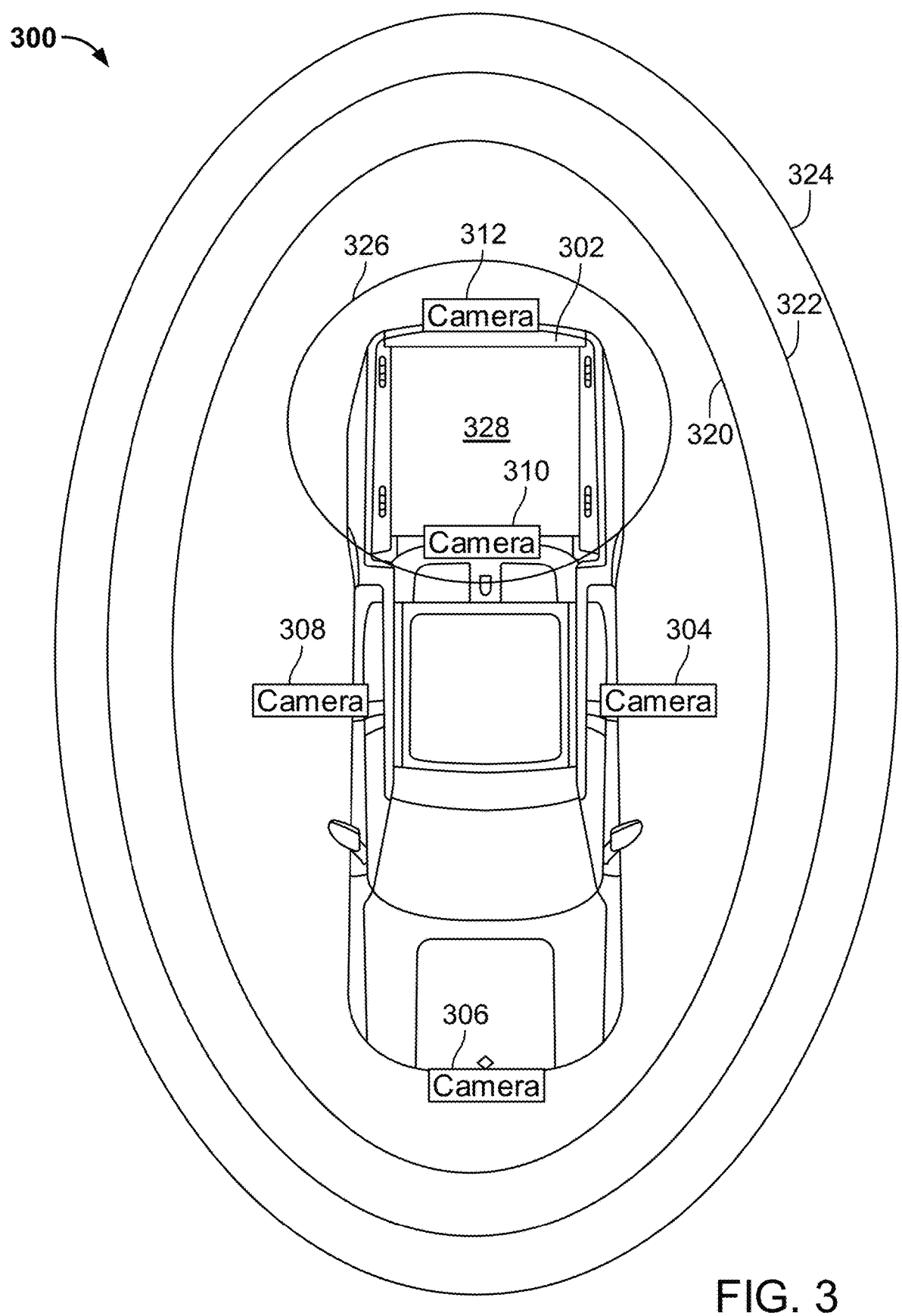
FIG. 3 shows a top view of an illustrative vehicle configured with a monitored area for deterring an intruder, in accordance with some embodiments of the present disclosure.

FIG. 3 shows a top view 300 of an illustrative vehicle 302 configured with a monitored area for deterring an intruder, in accordance with some embodiments of the present disclosure. Top view 300 includes a depiction of vehicle 302 along with the position of the cameras disposed around the vehicle. Vehicle 302 may include multiple cameras 304, 306, 308, 310 and 312, and a plurality of deterrence thresholds 320, 322, 324 and 326, and a proximity sensing module, not shown. In some embodiments, one or more components (e.g., object detection network 210 and proximity sensing module 218) of system 200 may be implemented by processing circuitry 102 (and/or processing circuitry of server 136). One or more of cameras 304, 306, 308, 310 and 312 may each correspond to one of sensors 124, 126, 127, 128, 130. Camera 304 is positioned on a first side of the vehicle, camera 306 is positioned on a front side of the vehicle, camera 308 is positioned on a second side of the vehicle, camera 312 is positioned on a rear side of the vehicle and camera 310 is positioned at the upper rear of an occupant compartment and has a view of the exterior storage area of the vehicle. In some embodiments, any suitable number of cameras may be used, and diverse positions of the cameras (e.g., showing a variety of different angles at varying distances from each other in various different environments) may be used. The use of cameras 304, 306, 308, 310 and 312 can be used to form the deterrence thresholds 320, 322, 324 and 326. For example, by having the cameras capture images surrounding the vehicle, objects that appear within a threshold distance may trigger a deterrence action. For example, a first deterrence threshold 324 of the plurality of deterrence thresholds 320, 322, 324, 326 may span any suitable distance from the vehicle and each subsequent deterrence threshold may be closer to the vehicle 302. For example, the first deterrence threshold 324 may be 10 feet from the vehicle, while the second deterrence threshold 322 may be 8 feet from the vehicle, the third deterrence threshold may be 4 feet from the vehicle, while a fourth deterrence threshold 326 may be within 1 foot of the exterior storage compartment 328. The proposed deterrence thresholds are illustrative and should not be limited in number and distance from the vehicle. In some embodiments, any two deterrence thresholds may be employed as part of the deterrence system. In some embodiments, the captured images may comprise a fisheye image of any suitable size (e.g., 1376× 976 fisheye image).

Figure 4:
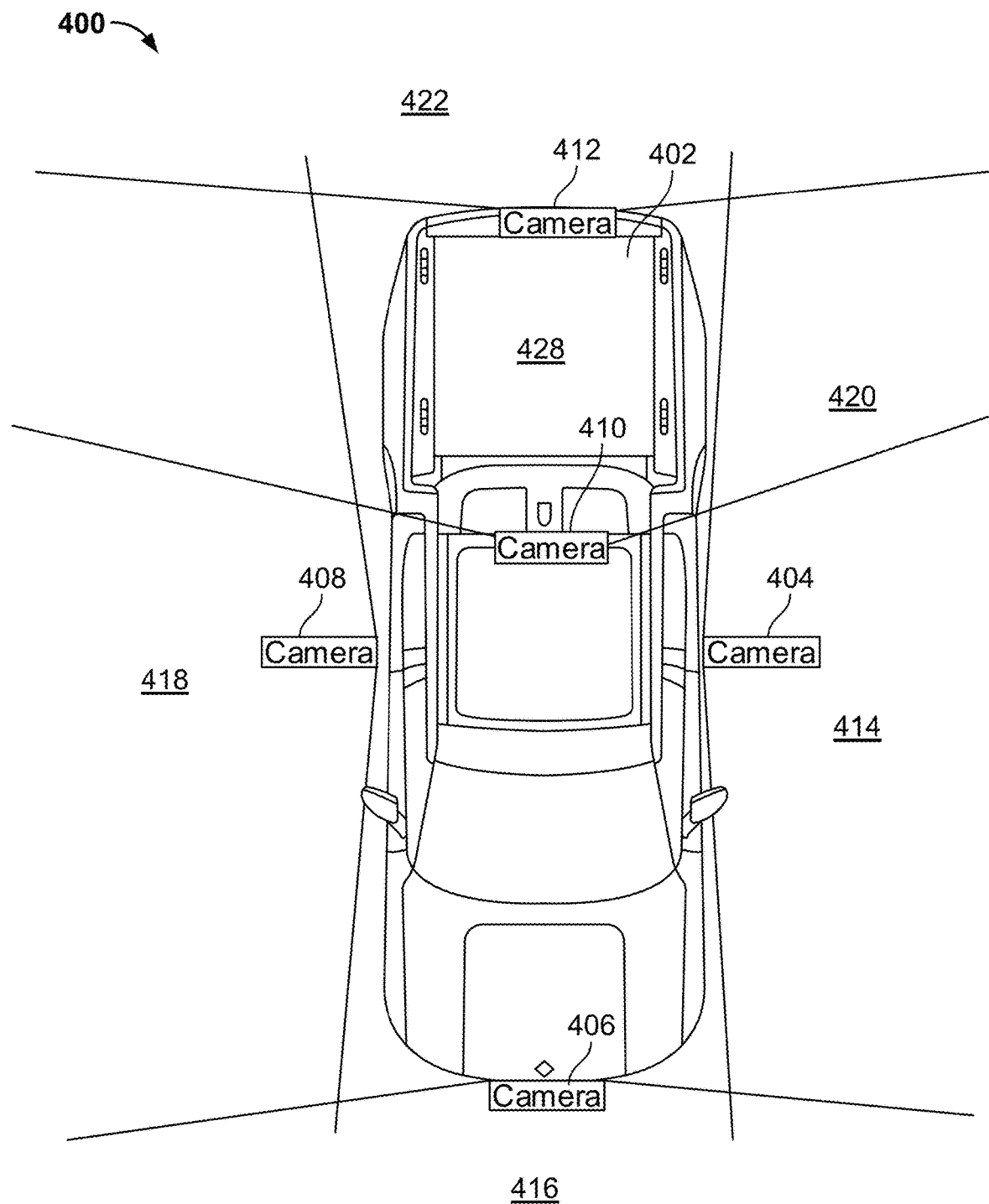
FIG. 4 shows a top view of an illustrative vehicle configured with a plurality of cameras disposed on the vehicle and their range of capture, in accordance with some embodiments of the present disclosure.

FIG. 4 shows a top view of an illustrative vehicle configured with a plurality of cameras disposed on the vehicle and their range of capture, in accordance with some embodiments of the present disclosure. Top view 400 includes a depiction of vehicle 402 along with the position of the cameras disposed around the vehicle. Vehicle 402 may include multiple cameras 404, 406, 408, 410 and 412, and a respective image range 414, 416, 418, 420 and 422 for each camera 404, 406, 408, 410 and 412. In some embodiments, one or more components (e.g., object detection network 210 and proximity sensing module 218) of system 200 may be implemented by processing circuitry 102 (and/or processing circuitry of server 136). One or more of the cameras 404, 406, 408, 410 and 412 may correspond to sensors 124, 126, 127, 128, 130 of FIG. 1 and/or cameras 304, 306, 308, 310 and 312 of FIG. 3. One or more of the cameras 404, 406, 408, 410 and 412 may be similarly positioned as described above in FIG. 3. In some embodiments, any suitable number of cameras may be used, and diverse positions of the cameras (e.g., showing a variety of different angles at varying distances from each other in various different environments) may be used. The use of the cameras 404, 406, 408, 410 and 412, and their respective captured images, can be used to for an insurance claim. For example, by having the cameras capture images surrounding the vehicle, objects that appear within an image range may trigger capturing an image. In some embodiments, capturing an image includes capturing a video and audio. For example, a first image range 414 corresponds to an image captured by camera 404, a second image range 416 corresponds to an image captured by camera 406, a third image range 418 corresponds to an image captured by camera 408, a fourth image range 420 corresponds to an image captured by camera 410 and a fifth image range 422 corresponds to an image captured by camera 412. The captured images may be captured in response to one or more motion-based events being detected by cameras 404, 406, 408, 410 and 412 or where an object is detected within any one of deterrence thresholds 320, 322, 324, 326 by cameras 304, 306, 308, 310 and 312 or any other sensors, e.g., ultrasonic sensors, radars.

Figure 5A:
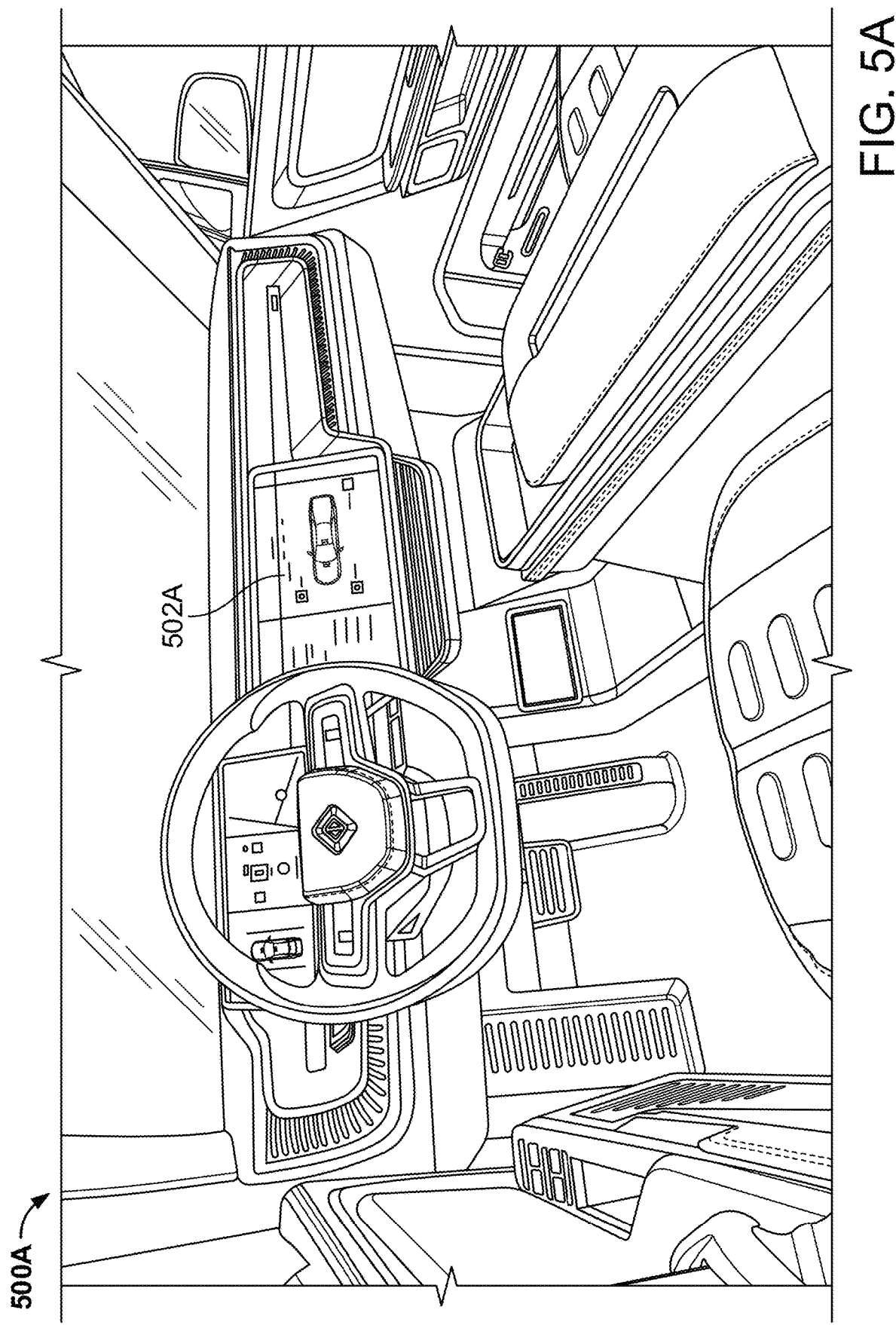
FIG. 5A depicts an illustrative example of a vehicle featuring a graphical user interface, in accordance with some embodiments of the present disclosure.

FIG. 5A depicts an illustrative example of a vehicle 500A featuring a graphical user interface 502A, in accordance with some embodiments of the present disclosure. Interface 502A may comprise at least one of an infotainment screen or mobile application display. In some embodiments, a graphical user interface 502A may refer to components incorporated into, coupled to, or accessible by a vehicle such as a vehicle 500A in FIG. 5A. The vehicle 500A is equipped with a graphical user interface 502A that may be used to enable/disable vehicle systems including options to enable and disable guard mode, vehicle deterrence mode, vehicle insurance claim processing mode or any other mode, or no mode at all. For example, a user in vehicle 500A may use the graphical user interface 502A to access options on the vehicle 500A. In some embodiments, the graphical user interface 502A may be incorporated into vehicle 500A or user equipment used to access such vehicle system while using vehicle 500A. In some embodiments, vehicle systems displayed on the graphical user interface 502A may be communicatively connected with user inputs (e.g., microphone and speakers for providing voice command) of the vehicle 500A. For example, the user may provide a voice command to activate the guard mode and the audio system incorporated into vehicle 500A may convert such a command to engage the vehicle guard mode.

Figure 5B:
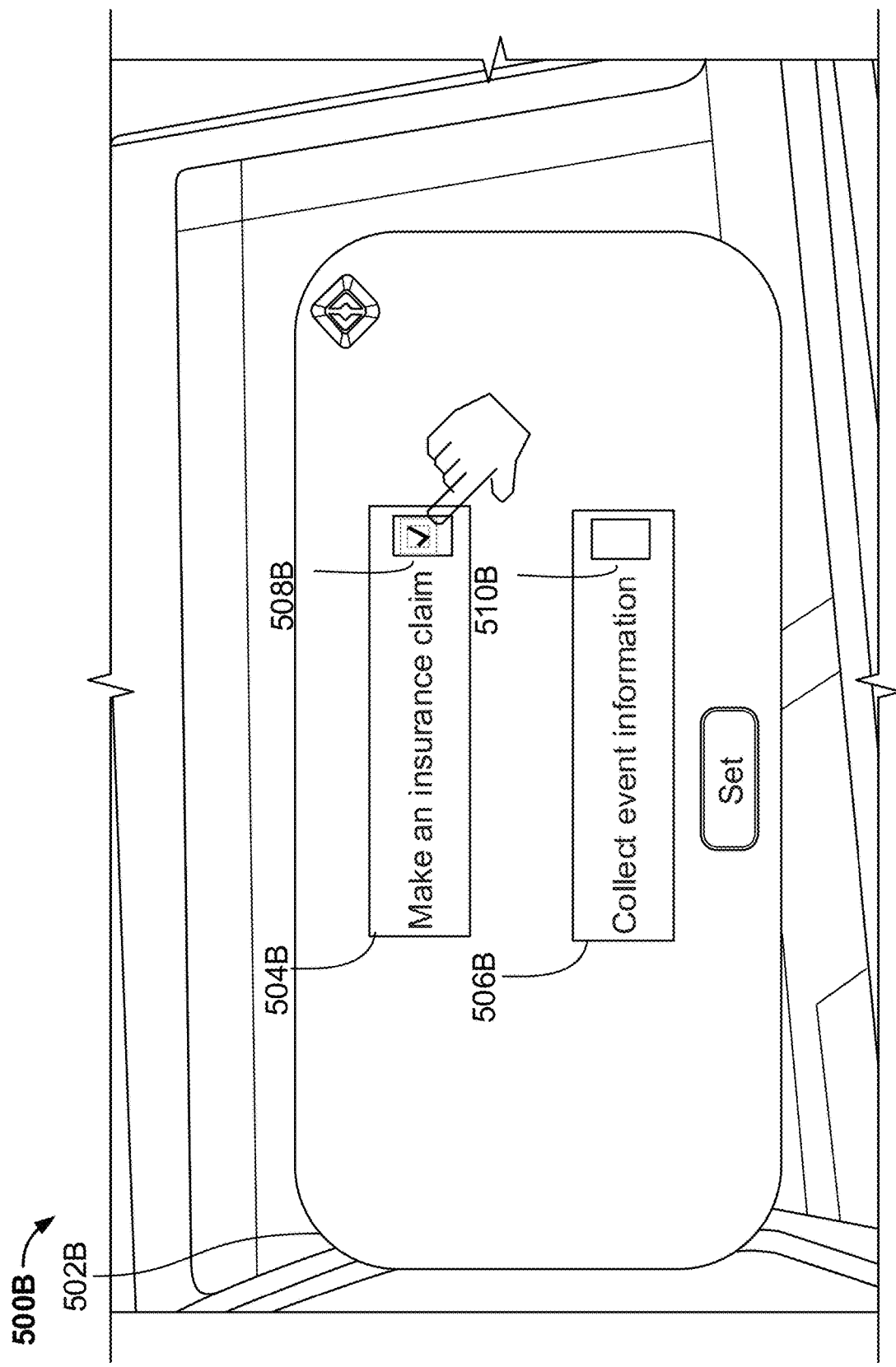
FIG. 5B depicts an example of a graphical user interface for receiving a request for an insurance claim, in accordance with some embodiments of the present disclosure.

As discussed above, in some embodiments, a user or occupant of the vehicle 500A may select an insurance claim mode incorporated into or accompanying the graphical user interface 502A by direct input into the user interface (e.g., activating the system via user interface 500B FIG. 5B). Upon a user's selection of the user interface 500B (e.g., selection of a vehicle mode option), an option 502B appears for insurance claim request 504B on the user interface 500B, as shown in the illustrative example in FIG. 5B. The insurance claim request mode option 504B corresponds to a selectable option that the user can enter to request an insurance claim. When the user or occupant of the vehicle accesses the insurance claim via the user interface (e.g., user input interface 500B (FIG. 5B)) incorporated into or accompanying the graphical user interface 502A, the user may start and populate the insurance claims using the checkmark option 508B. In some embodiments, the user may choose to collect event information 506B related to the collision and wait to submit a claim until the vehicle is inspected by a mechanic. In such a case, to populate the event information, the user may select the checkmark option 510B. In some embodiments, the vehicle may propose a Rivian Certified Repair Network to the user to inspect if the damage is less than the owner's deductible.

In some embodiments, a user or occupant of the vehicle 500A may select an alternative way of starting an insurance claim by employing a user device 138 from FIG. 1, requesting an insurance claim, incorporated into or accompanying the graphical user interface 502B, by direct input into the user interface. Upon a user's selection of an alternative way of requesting an insurance claim, the system may begin to process the captured images to determine if any images captured may be supportive of the insurance claim. For example, in response to requesting an insurance claim the system may identify and populate fields in the request from the captured images. The images may include metadata, for example, a timestamp, GPS locations and additional information pertaining to a collision. In some embodiments, the user may first view any captured images stored on the storage device, and from the image, request an insurance claim. By requesting an insurance claim from a captured image, the image would automatically be associated with the insurance claim.

Figure 6:
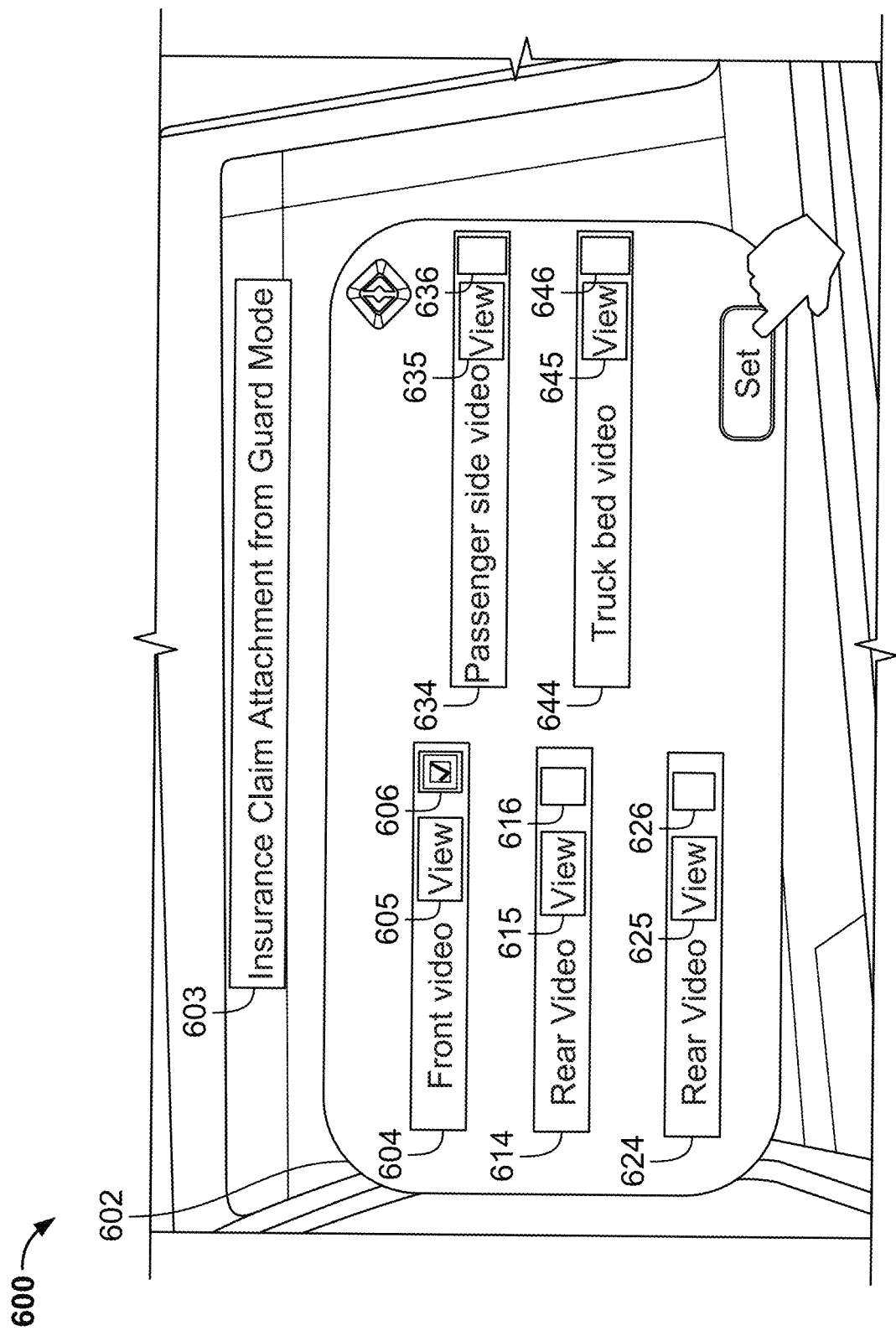
FIG. 6 depicts another example of a graphical user interface for associating a captured image to an insurance claim, in accordance with some embodiments of the present disclosure.

FIG. 6 depicts another example of a graphical user interface for associating a captured image to an insurance claim, in accordance with some embodiments of the present disclosure. As discussed above, in some embodiments, a user or occupant of the vehicle 600 may request an insurance claim incorporated into or accompanying the graphical user interface 502A by direct input into the user interface (e.g., activating the system via user interface 602 FIG. 6). From the user interface 602, titled "Insurance Claim Attachment from Guard Mode" the user has options to view images or video from any of cameras 304, 306, 308, 310 and 312 of FIG. 3. For each camera 304, 306, 308, 310 and 312 of FIG. 3, the user interface presents a link to a video for that camera 604, 614, 624, 634, 644 for any motion-based event including any collision-based events. Each listed option presents to view 605, 615, 625, 635, 645 the image or video corresponds to a respective camera 604, 614, 624, 634, 644, as well as the selectable option that the user can enter to select the image or video 606, 616, 626, 636, 646 to correspond to an insurance claim. The option to select an image or video is non limiting and may include one or more images. For example, for the request for an insurance claim 603, the user may select any one of the videos to correspond to the insurance claim. Further, upon selecting a front video 604 by entering a checkmark 606 in the corresponding box, the system 600 may extract metadata for this image and enter any specific metadata extracted into the insurance claims.

In one embodiment, the vehicle has autonomous vehicle functionality, such as sensing its environment and moving safely with little or no human input, including performing deterrence of intruders and completion of an insurance claim to reduce the user's frustration as the vehicle can be an Internet-connected vehicle, a vehicle that can communicate bidirectionally with other systems outside of the vehicle. The vehicle can communicate bidirectionally via an antenna array with a map database to facilitate the intruder deterrence and processing of an insurance claim.

Figure 7:
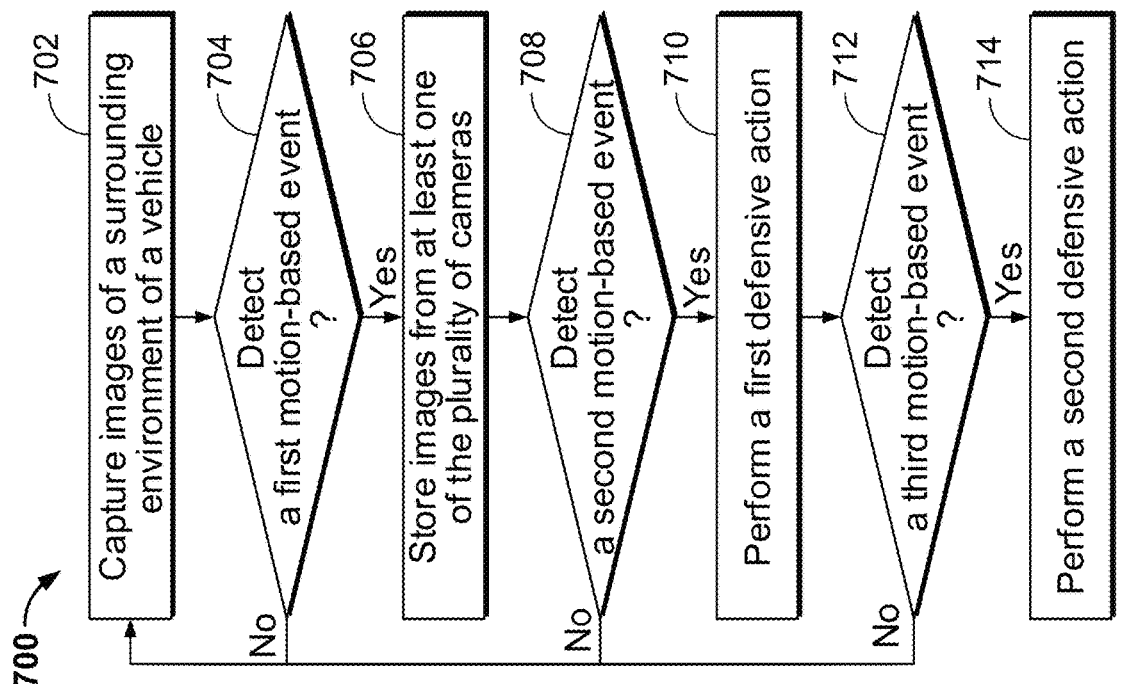
FIG. 7 shows a flowchart of an illustrative process for performing a deterring action in response to detecting an intruder, in accordance with some embodiments of the present disclosure.

FIG. 7 shows a flowchart of an illustrative process 700 for performing a deterring action in response to detecting an intruder, in accordance with some embodiments of the present disclosure. Process 700 may be executed at least in part by processing circuitry 102 and/or processing circuitry of server 136.

At 702, processing circuitry 102 may capture images of a vehicle's surrounding environment, e.g., captured by cameras 204, 206, 208, which may be wide-angle fisheye cameras as part of monitoring the vehicle to deter theft and vandalism deterrent. In some embodiments, processing circuitry 102 captures the images whether the vehicle is in motion or stationary. In some embodiments, the captured images may be in response to a user enabling a guard mode which monitors the surrounding area of the vehicle for intruders or objects within in a threshold distance from the vehicle. In some embodiments, the processing circuitry may employ the neural network 214 to provide an annotation appended thereto, or otherwise input to information metadata, where the annotation indicates a particular class (e.g., person, car, bus, motorcycle, train, bicycle, etc.) and/or a vehicle to object distance annotation.

At 704, processing circuitry 102 may detect a first motion-based event surrounding an environment around vehicle 101, e.g., captured by cameras 204, 206, 208, which may be wide-angle fisheye cameras that may detect motion within a first deterrence threshold 324. In some embodiments, the vehicle may be in a sleep mode with only ultrasonic sensors monitoring the surrounding environment of the vehicle 101 and in response to detecting a first motion-based event, the system may wake up the vehicle and initiate camera-based monitoring for intruders and/or collisions. Any suitable number of images may be captured at any suitable capture rate. In some embodiments, the system may identify false positives by applying a time limit on the length of time the intruder is within a first deterrent threshold. For example, someone walking by the front of the vehicle may not be an intruder if they are in the frame for less than a couple of seconds. If processing circuitry detects a first motion-based event, ("Yes" at step 704), the processing circuitry proceeds to step 706. Otherwise, if the detected image does not identify a first motion-based event or the detection is falsely identified object and/or is beyond a range of interest (e.g., 10 feet) from vehicle 101, the image(s) may be discarded, and process returns to step 702. In some embodiments, the processing circuitry stores the images and permits them be overwritten if not accessed and saved.

At 706, processing circuitry 102 may store images from the first motion-based event of an environment around vehicle 101, e.g., captured by one or more cameras 204, 206, 208, which may be wide-angle fisheye cameras or a combination or fisheye and standard cameras. In some embodiments, object-to-vehicle distance may be determined using the training data of neural network 214 or a portion thereof, e.g., indicating annotations of distances between objects and a subject vehicle. In some embodiments, object-to-vehicle distance estimation may be trained on using ultrasonic sensors and/or training images in which an object is within 10 feet from a vehicle (e.g., manually tagged to indicate a distance from the object to the vehicle).

At 708, cameras 204, 206, 208 may detect a second motion-based event surrounding an environment around vehicle 101, e.g., captured by cameras 204, 206, 208, which may be wide-angle fisheye cameras within a second deterrence threshold 322. The second motion-based event may be in response to the first motion-based event or may be a separate event where an object is detected within the second deterrent threshold. In such a case, detecting an object within the second deterrent threshold also satisfies detecting an object with in a first deterrent threshold. Any suitable number of images may be captured at any suitable capture rate. If processing circuitry detects a second motion-based event, ("Yes" at step 708), the processing circuitry proceeds to step 710. Otherwise, if the detected image does not identify a second motion-based event or the detection is a falsely identified object and/or is beyond a range of interest (e.g., 8 feet) from vehicle 101, the image(s) may be discarded, and process returns to step 702.

At 710, processing circuitry 102 may perform a first defensive action. For example, the processing circuitry 102 may use one or more audible alerts, visual alerts, closing windows, locking a door, or closing an enclosure on the vehicle. The system may perform the first defensive action to deter the intruder from approaching the vehicle closer. In some embodiments, the first defensive action may play over a speaker of the vehicle as a pre-recorded or live audible alert or notification (e.g., "you are being recorded, please move away from the vehicle") warning the intruder. In some embodiments, an alert to a mobile application associated with the vehicle is sent and may be sent in addition to the first defensive action being played over a speaker. A device of the user may be configured to show a live feed of the camera with the best video of the intruder in response to a push notification from the system or the user interacting with an icon. The device of the user may also be configured to specific or recommended vehicle control options to the user based on the type of intruder. Some examples of specific or recommended control options for the user to select may include honking the horn, closing the tonneau cover, flashing lights, broadcasting audible alerts (e.g., flash a few lights and sound horn for an animal versus an intruder trying steal items where loud audible alarm and all lights are flashed, or someone just looking inside the window to see the interior where only a light flash may be appropriate). In some embodiments, the vehicle may be configured for machine learning or may be communicatively coupled to a system configured for machine learning. The machine learning may improve characterization of motion-based events based on repeated binning of related information considering related vehicle conditions. For example, the data collected while the vehicle experiencing various motion-based events while the vehicle is driving may result in image processing that is slightly different from when the vehicle is processing images while still. A remote server comprised of machine learning software may be configured to bin events based on shared conditions (e.g., the vehicle was or is moving, or the vehicle is stationary) in order to improve the efficiency of state change recommendation, various component or subsystem activation, or combinations thereof. The use of a neural network configured for machine learning improves the efficiency of recommended software updates to the vehicle or systems that comprise the vehicle. The updates may be reviewed by a remote administrator or the driver. Either the administrator or the driver may be provided an interface to accept or reject the various updates or preferences recommended or presented by the machine learning aspect of the system as related to characterizing data for identifying or determining motion-based events, as related to responding to the identified or determined motion-based events, or combinations thereof.

At 712, processing circuitry 102 may detect a third motion-based event surrounding an environment around vehicle 101, e.g., captured by cameras 204, 206, 208, which may be wide-angle fisheye cameras within a third deterrent threshold 320. If processing circuitry detects a third motion-based event, ("Yes" at step 708), the processing circuitry proceeds to step 714. Otherwise, if the detected image does not identify a third motion-based event or the detection is a falsely identified object and/or is beyond a range of interest (e.g., 4 feet) from vehicle 101, the image(s) may be discarded, and process returns to step 702. The second defensive action may be one or more of a visual alert, an audible alert, closing a window, locking a door, or closing an enclosure. In some embodiments, the second defensive action may close a motorized tonneau cover on an exterior storage area. In some embodiments, the closed motorized tonneau cover is over the truck bed. In some embodiments, the truck bed includes a number of thresholds triggers that each correspond to deterrent thresholds based on proximity of an intruder to a truck bed. For example, a first deterrent threshold for an object approaching the perimeter of a vehicle may cause an alarm to flash or a horn to sound, and another deterrent threshold for an object/intruder accessing a storage area—e.g., an arm is detected reaching into the truck bed, may cause the motorized tonneau cover to close. In such a case, the motorized tonneau cover may begin to close along an alarm to alert the intruder. In some embodiment, closing the motorized tonneau cover may begin in response to the object or intruder approaching the first deterrent threshold.

In some embodiments, based on the output of proximity sensing module 218, processing circuitry 102 may determine whether object detection representation 216 is an outlier. For example, processing circuitry 102 may determine whether the object is located at a portion of the image (e.g., a sky) where an object of that particular class (e.g., a person) is unlikely to be detected, and/or is beyond a range of interest (e.g., 10 feet) from vehicle 101. If the output indicates object detection representation 216 is a falsely identified object and/or is beyond a range of interest (e.g., 10 feet) from vehicle 101, the image(s) may be discarded.

Figure 8:
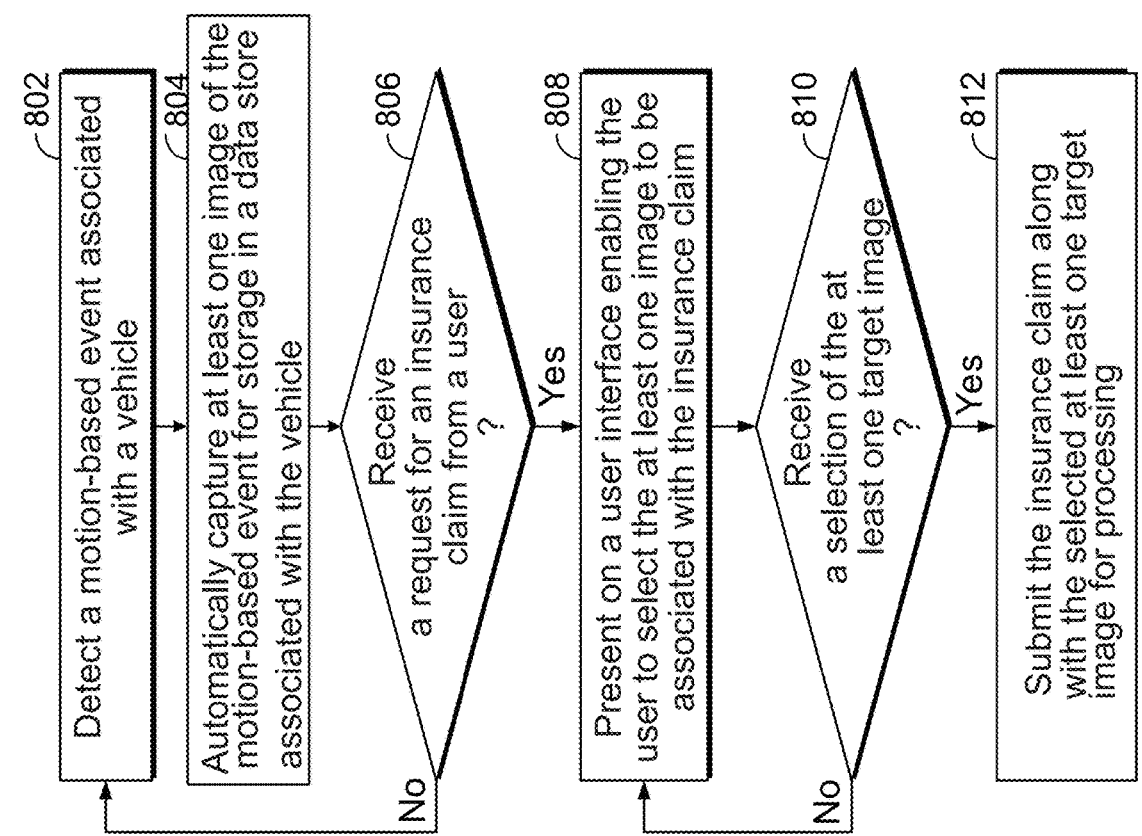
FIG. 8 shows a flowchart of an illustrative process for populating an insurance claim after determining a collision event, in accordance with some embodiments of the present disclosure.

FIG. 8 shows a flowchart of an illustrative process for populating an insurance claim after determining a collision event, in accordance with some embodiments of the present disclosure. At 802, processing circuitry 102 may detect a motion-based event associated with a vehicle, e.g., captured by cameras 204, 206, 208, which may be wide-angle fisheye cameras. In some embodiments, processing circuitry records by cameras 204, 206, 208 in a loop the entire time the vehicle is in motion and if no motion-based event or collision-based event is detected, the recording is overridden by subsequent recordings. In some embodiments, a motion-based event is a collision event. If processing circuitry detects a motion-based event, ("Yes" at step 802), the processing circuitry proceeds to step 804. Otherwise, if the detected image does not identify a motion-based event the system reverts to monitoring the surrounding area of the vehicle.

At 804, processing circuitry 102 automatically captures at least one featured image of the motion-based event surrounding an environment around vehicle 101, e.g., captured by cameras 204, 206, 208, which may be wide-angle fisheye cameras may detect motion. Any suitable number of images may be captured at any suitable capture rate. In some embodiments, the captured images may be in response to a user enabling a guard mode that monitors the surrounding area of the vehicle for intruders or objects within a threshold distance from the vehicle. In some embodiments, the processing circuitry may employ the neural network 214 to provide an annotation appended thereto, or otherwise input to information metadata, where the annotation indicates a particular class (e.g., person, car, bus, motorcycle, train, bicycle, etc.) and/or a vehicle to object distance annotation.

At 806, processing circuitry 102 may receive a request for an insurance claim from a user, e.g., a request submitted on a user interface of the vehicle or a user device 500. In some embodiments, the processing circuitry receives the insurance claim via an infotainment screen or a vehicle mobile application operating on a user device 138. In some embodiments, a user or occupant of the vehicle 500A may select an insurance claim mode incorporated into or accompanying the graphical user interface 502A by direct input into the user interface (e.g., activating the system via user interface 500B FIG. 5B). If processing circuitry receives request for an insurance claim, ("Yes" at step 806), the processing circuitry proceeds to step 808. Otherwise, if the detected image does not receive a request for an insurance claim, system reverts to monitoring the surrounding area of the vehicle.

At 808, the processing circuitry presents selectable icons on the user interface, enabling the user to select the at least one featured image or video to be associated with the insurance claim. The system may present a number of images from each camera around the vehicle for the user's consideration.

At 810, processing circuitry 102 may receive a selection of the at least one featured image from the motion-based event. In some embodiments, a user or occupant of the vehicle 500A may select an image to associated with the insurance claim and incorporate to streamline the processing of the claims. If processing circuitry receives a selection of an image, ("Yes" at step 810), the processing circuitry proceeds to step 812. Otherwise, if a "No" selection is received for the insurance claim then, the system reverts to presenting other images for consideration of the insurance claim.

At 812, processing circuitry 102 may submit the insurance claim along with the selected at least one featured image for processing. In such an example, the insurance claim is completed in a seamless and efficient way to achieve faster processing and corrective action for the vehicle.

Figure 9:
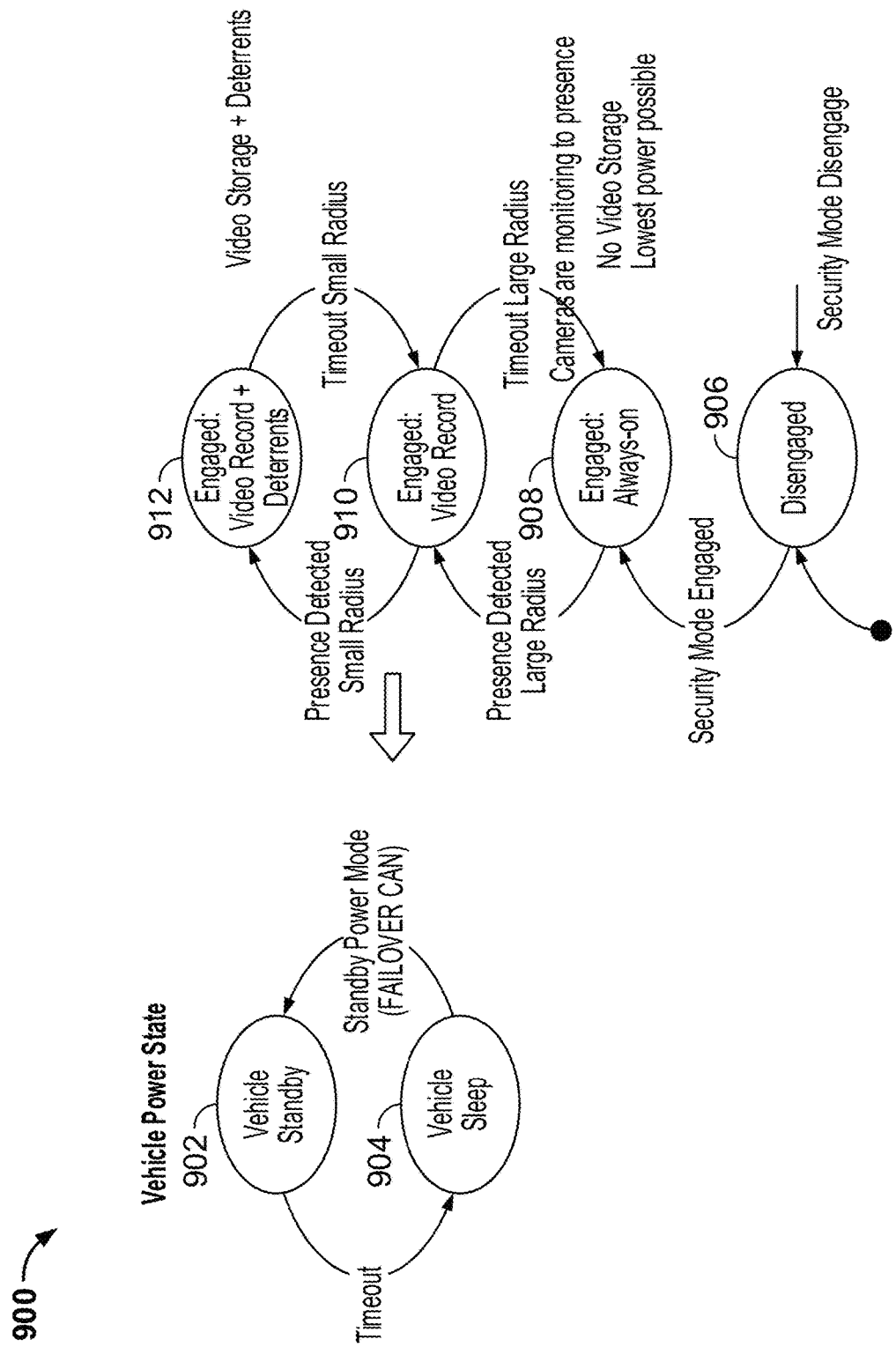
FIG. 9 shows a flowchart of an illustrative process for optimizing the power supply while operating in a deterring mode, in accordance with some embodiments of the present disclosure.

FIG. 9 shows a flowchart of an illustrative process for optimizing the power supply while operating in a guard mode, in accordance with some embodiments of the present disclosure. The processing circuitry 102 may monitor the vehicle power state to monitor the surrounding environment of the vehicle 101. For example, when the battery level is low, the system may be disengaged to avoid draining the battery power. At 904, the system starts at a vehicle sleep mode. For example, when there are no intruders and no impending collisions. In this mode, the vehicle preserves battery power. At 902, in response to an intruder approaching the vehicle or an impending collision is identified, the system switches to the vehicle standby mode. In the standby mode, the vehicle may issue deterrents, for example, first defensive action and second defensive action discussed above in more detail. The guard mode starts in a disengaged mode at 906, and in response to a request or automatically based on locking the vehicle, the vehicle guard mode is engaged to step 908. In 908, the guard mode is engaged and monitoring the surrounding environment. When the presence of an object, such as an intruder, is detected within a first deterrence threshold 324 (e.g., large radius), then at 910, the system begins to record the vehicle's surrounding environment. If the presence of the object ceases, then the guard mode reverts to monitoring the vehicle's surrounding environment. Continuing to 912, when the presence of an object, such as an intruder, is detected within a second deterrence threshold 322 (e.g., small radius), then at 912, the system begins to record the vehicle's surrounding environment and play audible and visual alerts, as discussed earlier. In the case that the presence of the object, such as an intruder, is out of the first threshold, then the system returns to the previous step. In each of the previous steps, as the vehicle shifts from a disengaged status to an engaged status, the vehicle increases in power usage and when operating in battery conservation mode, the length that the vehicle remains at the higher power modes is reduced.

Figure 10:
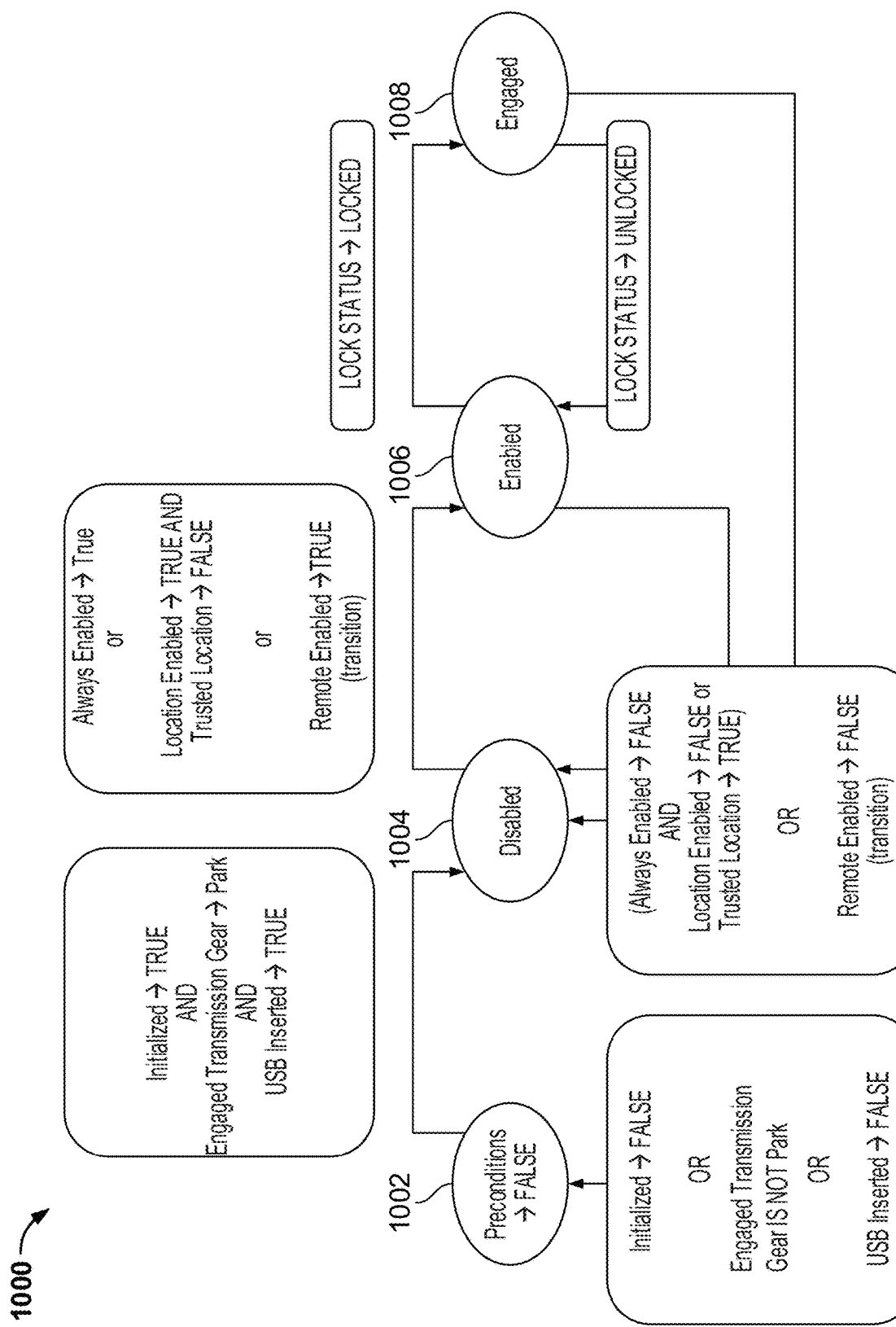
FIG. 10 shows a flowchart of an illustrative process for operating the vehicle in a deterring mode, in accordance with some embodiments of the present disclosure.

FIG. 10 shows a flowchart of an illustrative process for operating the vehicle in a deterring guard mode, in accordance with some embodiments of the present disclosure. In FIG. 10, the system includes a four states of the guard mode, from precondition state 1002, disabled state 1004, enabled state 1006 and engaged state 1008. In the precondition state 1002, the vehicle operator can set the conditions determining the motion-based events and the defensive action in response to an intruder. Further, the vehicle may include a storage device for capturing the video content. In the disabled state 1004, the vehicle operator has preprogrammed the guard mode but is electively disabled the guard mode or is missing at least one criteria (e.g., missing storage device). In the enabled state 1006, the vehicle is enabled in the guard mode and is unlocked. In this mode, the vehicle does not record any content. In the engaged state 1008, the vehicle is locked and monitoring for intruders and ready to perform any and all defensive actions.

Figure 11:
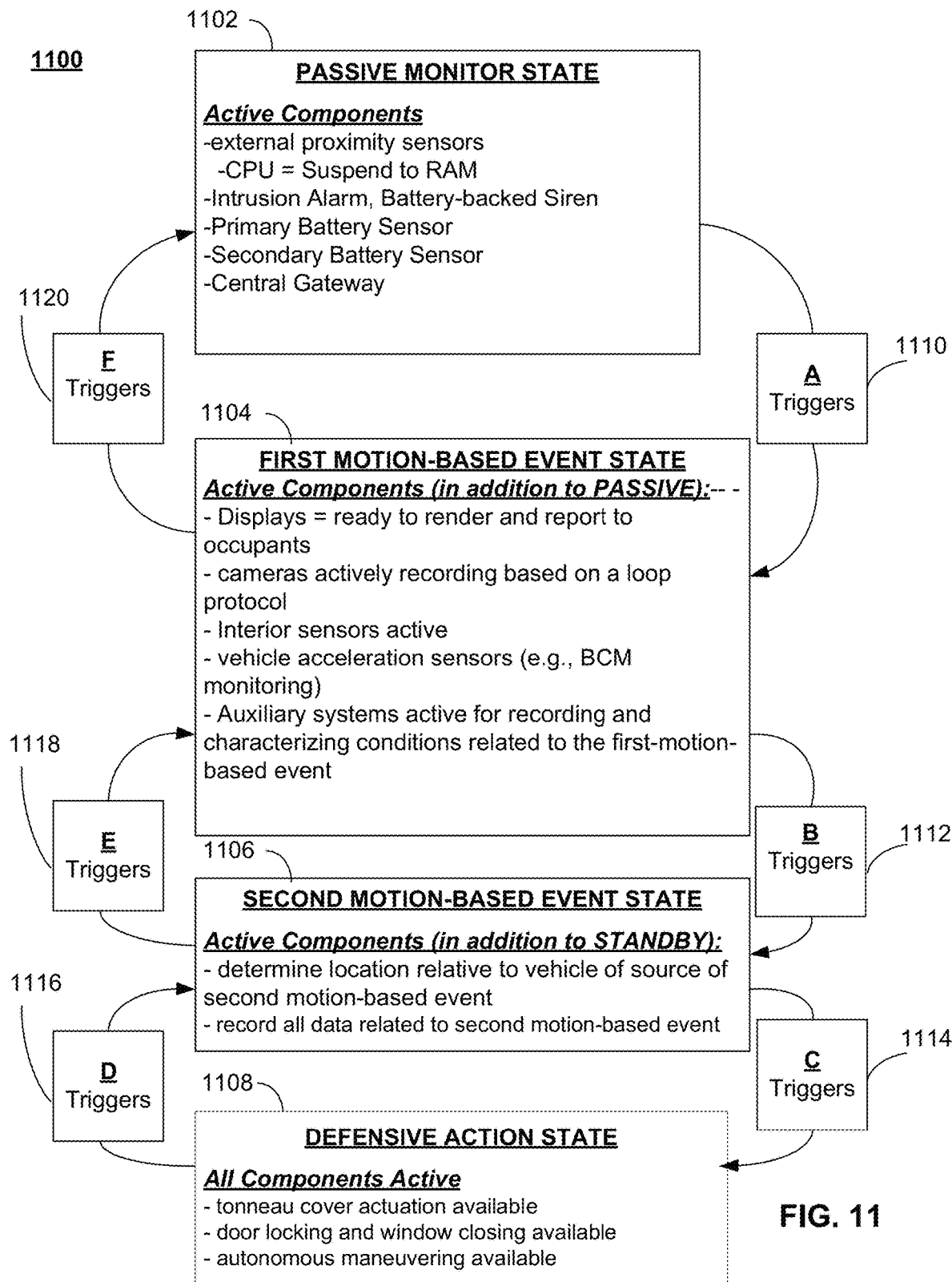
FIG. 11 illustrates a flow diagram of illustrative transitions between states of controllers of the system of FIG. 1, in accordance with some embodiments of the present disclosure.

FIG. 11 illustrates a flow diagram 1100 of illustrative transitions between vehicle states of a vehicle that is comprised of domain controllers 160 of system 100 of FIG. 1, in accordance with some embodiments of the present disclosure. Each vehicle state of the vehicle is defined by which components, processes, or combinations thereof are active based on power supplied from the vehicle. The power supplied from the vehicle is controlled by vehicle power mode controller 158 of FIG. 1, which is communicably coupled to domain controllers 160. Processing circuitry 102 communicates via vehicle power mode controller 102 to activate at least one of domain controllers 160 to active necessary or relevant components, systems, processes, or combinations thereof, in response to determining one or more motion-based events, captured and characterized by various sensors and cameras of the vehicle, requires a change in a vehicle state (e.g., a first motion-based event may trigger activation of short interval cameras and a second motion-based event may trigger activation of alarms or strobing warning lights).

Domain controllers 160 enable a plurality of components, systems, subsystems, processes, or combinations thereof, to receive power from the vehicle depending on which domain controller is given an instruction through vehicle power mode controller 158 (e.g., based on an input from processing circuitry 102). Depending on which of domain controllers 160 receives activation instructions, the vehicle will be in a different state. For example, vehicle states enabled by domain controllers 160 may comprise a passive monitor state, a first motion-based event state, a second motion-based event state, and a defensive action state. As shown in FIG. 11, each of passive monitor state 1102, first motion-based event state 1104, second motion-based event state 1106, and defensive action state 1108 enable and disable different vehicle components, systems, subsystems, processes, or combinations thereof.

Processing circuitry 102 may transition between the vehicle power mode states based on triggers (e.g., A 1110, B 1112, C 1114, D, 1116, E 1118, and F 1120). In response to a determination to transition between vehicle power mode states, processing circuitry 102 broadcasts the updated vehicle power mode to each domain controller 160. For example, in response to determining that trigger A 1110 is satisfied when the current vehicle power mode is passive monitor state 1102, processing circuitry 102 broadcasts first motion-based event state 1104 as the new vehicle power mode to domain controllers 160, which each interprets the broadcast power mode and makes a determination of whether to update their current power state. For example, during a wake-up process (e.g., when a user is approaching vehicle 101), domain controllers 160 may interpret the broadcast vehicle power modes and make the determinations of whether to update their current state to a higher energy state (e.g., while transitioning from passive monitor state 1102 to defensive action state 1108). Similarly, during a shut-down process (e.g., when a user leaves vehicle 101), domain controllers 160 may interpret the broadcast vehicle power modes and make the determinations of whether to update their current state to a lower energy state (e.g., while transitioning from defensive action state 1108 to passive monitor state 1102). As described in further detail below, triggers (A 1110-F 1120) may include user and vehicle 101 actions or conditions that processing circuitry 102 uses to transition between vehicle power modes, as well as blockers and overrides that prevent transitions between vehicle power modes.

In passive monitor state 1102, certain domain controllers may continue to operate periodically (e.g., in a stealth state not shown in FIG. 11 and inclusive of at least one of the depicted active components in order to reduce vehicle power draw while also maintaining a level of vehicle monitoring which would yield a change in a vehicle state in response to determining additional systems, components, subsystems, processes, or combinations thereof, require activation to at least ensure appropriate vehicle monitoring). For example, when a user has left vehicle 101 (e.g., triggering a lock command and timeout of a lock to sleep parameter) and processing circuitry 102 sends out a sleep command (e.g., vehicle power mode controller 158) to each of the plurality of domain controllers 160. Vehicle 101 remains capable of responding to various user inputs, so long as a power source is capable of powering at least one component or subsystem in the vehicle corresponding to a user's inputs. By regulating when power is provided and how much, the vehicle and the various components and subsystems thereof remain accessible without taxing the vehicle power supply thereby reducing startup time in response to user inputs or other sourced inputs. Passive monitor state 1102 enables enough domain controllers or devices to remain active for an initial characterization of a first motion-based event with respect to, for example, at least deterrence threshold 324 of FIG. 3. For example, where an approaching object following a possible impact trajectory passes into at least deterrence threshold 324, various imaging and sonar sensors and cameras may become powered on to verify if additional characterization or actions are needed.

Additionally, as shown, in some embodiments, in passive monitor state 1102, the intrusion alarm and battery-based siren are active, as well as primary and secondary battery sensors, processing circuitry 102 (or elements of processing circuitry 102), and various external sensors. However, this is only an example, and other suitable components or domain controllers may be active or partially active in passive monitor state 1102.

As shown, while in passive monitor state 1102, processing circuitry 102 may determine to transition to first motion-based event state 1104, in response to trigger A 1110 being satisfied. In some embodiments, trigger A 1110 may be satisfied in response to either user actions or vehicle events occurring. In some embodiments, the user actions may include when a vehicle operator entry is detected based on a signal from a mobile activation device, a door ajar or window open signal is received, a hazard switch is activated, a vehicle alarm alert is received, or eCall/SoS button is activated (e.g., based on an interaction between an object or intruder with the vehicle or a mobile activation by a user monitoring the state of the vehicle and conditions of the surrounding environment). In some embodiments, the vehicle event may include when an internal timer alarm is detected, a low battery alert is received, a scheduled charge is detected, a guard mode alert is received, or cabin or battery thermal conditioning is required which may relate to which vehicle state may be enabled or can be enabled. The vehicle event, in addition to the motion-based event, may be reported to the user either through the vehicle or via a remote device that is communicatively coupled to the vehicle. In response to determining that trigger A 1110 is satisfied (e.g., a first motion-based event is determined to have occurred or has been identified based on characterization of video data, sensor data, or a combination thereof), processing circuitry 102 transitions to first motion-based event state 1104 and broadcasts the corresponding vehicle power mode to domain controllers 160. In some embodiments, determining trigger A 1110 is satisfied also results in a notification being generated for user perception based on the motion-based event, the vehicle event, or combinations thereof.

In first motion-based event state 1104, in addition to the active components of passive monitor state 1102, additional vehicle components and domain controllers may also be active. For example, displays of the vehicle may be ready to render and report to occupants. The information reported for these displays may be rendered for mobile devices communicatively coupled to the vehicle. Cameras interfacing with the vehicle, both internal and external, may be configured to record based on a loop protocol, depending on which deterrence threshold is breached. For example, a breach of deterrence threshold 324 may result in 5 second recordings based on instructions from a neural network. Each 5 second recording may be stored remotely for analysis and event detection. In another example, a breach of deterrence threshold 326 may result in a 30 second loop of recording. Each 30 second recording may also be sent to a remote server for analysis of motion-based events. Interior sonar (e.g. at least one sensor arranged within the vehicle passenger area, the vehicle storage area, or combinations thereof, configured to collect environmental data based on sonar responses recorded, non-visual data collection, or combinations thereof), imaging, and condition sensors may also be activated and vehicle acceleration sensors (e.g., as enabled by a body control module or BCM monitoring protocol to characterize an extent of damage from an impact resulting in activation of various vehicle systems) may be configured to characterize vehicle motion and compare the vehicle motion to data sets related to known or previous motion-based events triggering vehicle state changes as well as data sets related to vehicle motion considered normal, baseline, or nominal that do not result in vehicle state changes. Additional auxiliary systems active for recording and characterizing conditions related to the first-motion-based event and identifying a second motion-based event may also be powered on to increase the accuracy of the event detection and characterization. Auxiliary systems may include activating door control modules, tailgate/liftgate control modules, all closure handles (e.g., doors, tailgate, trunk, frunk, gear tunnel), exterior lighting (e.g., functional and courtesy lighting), seat control modules, steering column adjust motors, and other vehicle condition or position adjustment capable modules throughout the vehicle system.

As shown, while in first motion-based event state 1104, processing circuitry 102 may determine to transition to second motion-based event state 1106, in response to trigger B 1112 being satisfied (e.g., in response to determining, detecting, characterizing, or a combination there of, of a second motion-based event) or to determine to transition to passive monitor state 1102, in response to trigger F 1120 being satisfied (e.g., during a shut-down process). In some embodiments, trigger B 1112 may be satisfied when an internal or external camera, an internal or external sensor, or a combination thereof, provides data indicative of an identifiable second motion-based event. For example, the first motion-based event may involve someone approaching a vehicle cargo area and the second motion-based event may involve that someone breaking into a driver-side door (e.g., as determined by processing circuitry that receives data from at least one sensor indicating a car alarm is active, a window is broken, video or image processing captures the window being broken, sonar determines the vehicle compartment is breached, or any combination thereof). In response to determining that trigger B 1112 is satisfied (and not blocked such as by a determination that the vehicle lacks enough stored energy to enable a change in the vehicle state, a user provides an input to prevent a vehicle state change, processing circuitry determines the conditions that drove the state change instructions have passed, or any combination thereof), processing circuitry 102 transitions to second motion-based event state 1106 and broadcasts the corresponding vehicle power mode to domain controller 160.

In second motion-based event state 1106, in addition to the active components of first motion-based event state 1104, the additional vehicle components and domain controllers may also be active such as any or all cameras or sensors arranged throughout the vehicle system such that the second motion-based event may be properly characterized for processing an insurance claim.

As shown, while in second motion-based event state 1106, processing circuitry 102 may determine to transition to defensive action state 1108, in response to trigger C 1114 being satisfied (e.g., a person unidentifiable as a driver of the vehicle has entered the vehicle) or to determine to transition to first motion-based event state 1104, in response to trigger E 1118 being satisfied (e.g., during a shut-down process). In some embodiments, trigger C 1114 may be satisfied when the presence of the driver is detected or when a remote vehicle summon command is received, thereby enabling the vehicle to have defensive actions available while the vehicle driver is actively driving or sitting in the vehicle (e.g., where an accident may occur and the driver is not capable of collecting information to characterize the first motion-based event, the second motion-based event, or combinations thereof).

In defensive action state 1108, all vehicle components and domain controllers are active. That is, any remaining vehicle components or domain controllers that were not active in second motion-based event state 1106, are activated. While in defensive action state 1108, processing circuitry 102 may determine to transition to second motion-based event state 1106, in response to trigger D 1116 being satisfied (e.g., during a shut-down process). In some embodiments, trigger D 1116 may be satisfied when no driver presence is detected (e.g., a driver exits vehicle 101), an auto-park operation is competed, propulsion is disabled (e.g., a trouble code is generated preventing activation of the vehicle powertrain), conditions indicating at least one of the first motion-based event or the second motion-based event have concluded or are no longer present requiring defensive actions are detected by active cameras and sensors, or combinations of any of the listed satisfaction criteria for trigger D 1116, including those not listed and ascertainable from this disclosure as a whole. In some embodiments, trigger D 1116 may be blocked (or overridden) from being satisfied when the vehicle drive selector is set to reverse, neutral or drive (e.g., not park) or the driver, the vehicle, or a combination thereof, determines either the first or second motion-based event is something the driver can handle without use of vehicle systems (e.g., based on a period of stabilized driving as determined from various data collected from the vehicle system, based on a user providing an input indicating a state change is not required, based on conditions for a trigger for a state change being met, or combinations thereof). In some embodiments, in response to detecting the driver exiting vehicle 101, a timeout timer may be started. In response to determining that trigger D 1116 is satisfied (and not blocked or overridden), processing circuitry 102 transitions to second motion-based event state 1106 and broadcasts the corresponding vehicle power mode to domain controller 160.

As shown, while in second motion-based event state 1106, processing circuitry 102 may determine to transition to first motion-based event state 1104, in response to trigger E 1118 being satisfied (e.g., during a shut-down process). In some embodiments, trigger E 1118 may be satisfied when a user is still near vehicle (e.g., within twenty-five meters) or a low-voltage mode (LVM) is completed (e.g., low voltage batteries have been charged). In some embodiments, trigger E 1118 may be blocked (or overridden) from being satisfied when: pet mode is active; post-drive thermal conditioning is being performed (e.g., to prevent overheating); HV charge is active; HV power export is active; a battery is in a safe state; or no HV is allowed at the end of a drive. In response to determining that trigger E 1118 is satisfied (and not blocked or overridden), processing circuitry 102 transitions to first motion-based event state 1104 and broadcasts the corresponding vehicle power mode to domain controllers 160.

As shown, while in first motion-based event state 1104, processing circuitry 102 may determine to transition to passive monitor state 1102, in response to trigger F 1120 being satisfied (e.g., during a shut-down process). In some embodiments, trigger F 1120 may be satisfied when: a predetermined time has passed since a lock command was received (e.g., thirty seconds); all vehicle closures have been closed and a predetermined time has passed (e.g., two minutes); all but one or fewer vehicle closures have been closed (e.g., only the vehicle tailgate remains open) and a predetermined time has passed (e.g., ten minutes); or a sleep mode is requested. In some embodiments, trigger F 1120 may be blocked (or overridden) from being satisfied when vehicle 101 is not in park, HV is enabled, programming updates or extended data collection sessions are determined to be required, or combinations thereof. In response to determining that trigger F 1120 is satisfied (and not blocked or overridden), processing circuitry 102 transitions to passive monitor state 1102 and broadcasts the corresponding vehicle power mode to domain controllers 160.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   determining a guard mode of a vehicle is enabled using processing circuitry installed in the vehicle;
   detecting a motion-based event associated with the vehicle using one or more of at least one vehicle sensor or at least one auxiliary vehicle system activated when the guard mode is enabled, wherein the at least one vehicle sensor and the at least one auxiliary vehicle system are installed in the vehicle and are communicatively accessible to the processing circuitry;
automatically capturing one or more images of the motion-based event using a vehicle sensor of the at least one vehicle sensor or the at least one auxiliary vehicle system, wherein the one or more images are stored in a data store accessible by the processing circuitry;
receiving, based on an input to a vehicle display presenting a first user interface, a request to generate an insurance claim;
in response to receiving the request, presenting a second user interface on the vehicle display using the processing circuitry, wherein the second user interface provides selectable options to cause the one or more images stored in the data store to be associated with the insurance claim;
receiving at the second user interface a selection of at least one target image of the one or more images; and
facilitating processing of the insurance claim using the processing circuitry of the vehicle along with the selected at least one target image.

2. The method of claim 1, further comprising:
in response to the determining that the guard mode is enabled, activating, using the processing circuitry, one or more of the at least one vehicle sensor or the at least one auxiliary vehicle system; and
causing, using the processing circuitry, one or more of the at least one vehicle sensor or the at least one auxiliary vehicle system to capture data for characterizing the motion-based event, wherein the data is different from the one or more images.

3. The method of claim 1, further comprising:
in response to receiving the request for the insurance claim, automatically populating one or more fields in the request, wherein the one or more fields is selected from a date, a time, a location of the vehicle, or a location of the motion-based event.

4. The method of claim 1, wherein the motion-based event associated with the vehicle is based on at least one or more of a vehicle collision data, a vehicle pressure data, or an airbag deployment data.

5. The method of claim 1, further comprising:
in response to receiving the request for the insurance claim, identifying at least one featured image of the motion-based event to be associated with the insurance claim; and
populating the insurance claim with the identified at least one featured image.

6. The method of claim 1, wherein:
the at least one vehicle sensor is communicatively connected to an on-board vehicle computer communicatively coupled to the processing circuitry;
the on-board vehicle computer is configured to operate the vehicle; and
the on-board vehicle computer is configured to operate the vehicle as an autonomous vehicle.

7. The method of claim 6, wherein the on-board vehicle computer is communicatively connected to a mobile device via a wireless connection.

8. The method of claim 1, further comprising:
in response capturing at least one image of the one or more images of the motion-based event, determining the motion-based event is a collision event using the processing circuitry;
in response to determining the motion-based event is the collision event, identifying a location of damage associated with the collision event on the vehicle based on the at least one image; and
inserting, by the processing circuitry, the at least one image associated with the location of damage in the insurance claim, wherein the at least one image is a featured image.

9. The method of claim 1, wherein receiving the request to generate the insurance claim comprises receiving a request to generate the insurance claim based on the input to the vehicle display, wherein the vehicle display comprises one or more of a vehicle infotainment screen or a vehicle mobile application.

10. The method of claim 1, further comprising:
determining, using the processing circuitry, a level of damage to the vehicle based on at least one featured image of the one or more images of the motion-based event stored at a first data storage location; and
when the level of damage to the vehicle exceeds a threshold, causing, using the processing circuitry, the at least one featured image of the motion-based event to be stored at a second data storage location communicatively accessible by the processing circuitry and separate from the first data storage location.

11. The method of claim 1, wherein the at least one vehicle sensor is configured to capture an image or a video of a surrounding environment of the vehicle.

12. The method of claim 1, wherein presenting the second user interface comprises:
presenting, using the processing circuitry an alert of the motion-based event on one or more of the first user interface or the second user interface, wherein the alert appears on the vehicle display;
receiving, via the vehicle display, a selection to view at least one featured image of the motion-based event; and
generating for presentation on the vehicle display the at least one featured image.

13. The method of claim 1, wherein the motion-based event corresponds to a vehicle collision or a theft of one or more of a replacement vehicle part, a part of an assembly corresponding to the vehicle, an item for transport stored within the vehicle, or combinations thereof.

14. A system comprising:
at least one vehicle sensor installed in a vehicle and configured to automatically capture one or more images of a motion-based event, wherein the one or more images is stored in a data store; and
processing circuitry installed in the vehicle, wherein the processing circuitry is configured to:
determine a guard mode of the vehicle comprising the at least one vehicle sensor is enabled;
detect a motion-based event associated with the vehicle using the at least one vehicle sensor, wherein the at least one vehicle sensor is activated for data collection when the guard mode is enabled;
capture the one or more images of the motion-based event using the at least one vehicle sensor wherein the one or more images comprises at least one featured image that includes features that characterize the motion-based event;
store the one or more images in the data store, wherein the data store is communicatively accessible to one or more components of the vehicle;
receive, based on an input to a vehicle display presenting a first user interface, a request to generate an insurance claim;
in response to receiving the request, present a second user interface on the vehicle display, wherein the second user interface provides selectable options to cause the at least one featured image stored in the data store to be associated with the insurance claim;

receive at the second user interface a selection of the at least one featured image; and facilitate processing of the insurance claim along with the selected at least one featured image.

15. The system of claim 14, wherein the processing circuitry is further configured to:

in response to the determining that the guard mode is enabled, activate the at least one vehicle sensor to capture data different from the one or more images corresponding to the motion-based event; and cause the at least one vehicle sensor to capture data for characterizing the motion-based event.

16. The system of claim 14, wherein the processing circuitry is further configured to:

in response to receiving the request for the insurance claim, automatically populate one or more fields in the request, wherein the one or more fields is selected from a date, a time, a location of the vehicle, or a location of the motion-based event.

17. The system of claim 14, wherein the motion-based event associated with the vehicle is based on at least one or more of vehicle collision data, vehicle pressure data, or airbag deployment data.

18. The system of claim 14, wherein the processing circuitry is further configured to:

in response to receiving the request for the insurance claim, identify the at least one featured image of the motion-based event to be associated with the insurance claim; and populate the insurance claim with the at least one featured image.

19. The system of claim 14, wherein the processing circuitry is further configured to:

in response capturing the one or more images of the motion-based event, determine a collision event associated with the vehicle occurred;

in response to determining the collision event, identify a location of damage associated with the collision event on the vehicle based on the at least one featured image; and insert the at least one featured image associated with the location of damage in the insurance claim.

20. A system comprising:

a vehicle sensor installed in a vehicle and configured to automatically capture at least one featured image of a surrounding environment of the vehicle; and processing circuitry installed in the vehicle, wherein the processing circuitry is configured to:

determine a guard mode of the vehicle is enabled, wherein the guard mode activates the vehicle sensor for capturing data corresponding to the surrounding environment;

detect, based on data captured by the vehicle sensor, a collision event associated with the vehicle;

identify the at least one featured image based on the data captured by the vehicle sensor that characterizes the collision event;

store the at least one featured image in a data store communicatively accessible to the processing circuitry;

in response to detecting the collision event, receive a request for an insurance claim, wherein the request is based on an input to a vehicle display presenting a first user interface;

in response to receiving the request, present a second user interface on the vehicle display, wherein the second user interface provides selectable options to cause the at least one featured image to be associated with the insurance claim;

receive a selection of the at least one featured image at the second user interface; and facilitate processing of the insurance claim based on the selected at least one featured image.

* * * * *